(12) United States Patent
Kim et al.

(10) Patent No.: US 11,910,418 B2
(45) Date of Patent: Feb. 20, 2024

(54) ELECTRONIC DEVICE AND METHOD FOR DETERMINING UPLINK OPERATION IN WIRELESS COMMUNICATION SYSTEM

(71) Applicant: Samsung Electronics Co., Ltd., Gyeonggi-do (KR)

(72) Inventors: Junsuk Kim, Gyeonggi-do (KR); Sangho Lee, Gyeonggi-do (KR); Soomin Lee, Gyeonggi-do (KR); Wonsuk Chung, Gyeonggi-do (KR); Suyoung Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 17/285,528

(22) PCT Filed: Nov. 15, 2019

(86) PCT No.: PCT/KR2019/015643
§ 371 (c)(1),
(2) Date: Apr. 15, 2021

(87) PCT Pub. No.: WO2020/105969
PCT Pub. Date: May 28, 2020

(65) Prior Publication Data
US 2021/0392649 A1   Dec. 16, 2021

(30) Foreign Application Priority Data
Nov. 21, 2018   (KR) .................. 10-2018-0144603

(51) Int. Cl.
*H04W 72/53*   (2023.01)
*H04W 76/16*   (2018.01)
(Continued)

(52) U.S. Cl.
CPC .............. *H04W 72/53* (2023.01); *H04W 8/24* (2013.01); *H04W 76/16* (2018.02); *H04W 88/06* (2013.01)

(58) Field of Classification Search
CPC ....... H04W 72/53; H04W 8/24; H04W 76/16; H04W 88/06; H04W 48/12; H04W 8/22;
(Continued)

(56) References Cited

U.S. PATENT DOCUMENTS

2016/0095004 A1*  3/2016  Tseng .................... H04W 76/16
                                                          370/329
2021/0392649 A1*  12/2021  Kim ...................... H04L 5/0053

FOREIGN PATENT DOCUMENTS

KR   10-2018-0010966 A    1/2018
WO   WO-2018029493 A1 *   2/2018

OTHER PUBLICATIONS

R4-1800068; "UE Dynamic power sharing for LTE-NR Dual Connectivity"; 3GPP TSG-RAN WG4 Meeting AH-1801; Jan. 15, 2018.
(Continued)

*Primary Examiner* — Julio R Perez
(74) *Attorney, Agent, or Firm* — Cha & Reiter, LLC

(57) ABSTRACT

An electronic device, according to various embodiments of the present invention, may comprise: a first communication circuit configured to provide first wireless communication using a first frequency band; a second communication circuit configured to provide second wireless communication using a second frequency band; a processor operatively connected with the first communication circuit and the second communication circuit; and a memory operatively connected with the processor, and configured to store information about the first frequency band and the second frequency band, wherein the memory can store instructions configured to, when executed, enable the processor to communicate with a first base station using the first communication circuit, (Continued)

to receive a first signal from the first base station, and to receive a second signal from a second base station using the second communication circuit on the basis of information on the frequency band while communicating with the first base station, and to select one of a single uplink operation or a dual uplink operation on the basis of information obtained or measured in response to receiving the first signal or the second signal.

12 Claims, 14 Drawing Sheets

(51) Int. Cl.
*H04W 8/24* (2009.01)
*H04W 88/06* (2009.01)

(58) Field of Classification Search
CPC ..... H04W 24/02; H04W 76/19; H04W 76/27; H04L 5/005; H04L 5/0053; H04L 5/0035; H04L 12/2803
See application file for complete search history.

(56) References Cited

OTHER PUBLICATIONS

R2-1800748; "CR on 38.331 for support of uplink operation mode in EN-DC (ASN.1 H034)"; Jan. 15, 2018.
R1-1801154; "TP in dual connectivity for TS38.213" 3GPP TSG RAN WG1 Meeting AH 1801; Jan. 29, 2018.
R2--1803380; Discussion and Text proposal on the power information exchange between MN and SN (ASN.1 H317); Feb. 21, 2018.

* cited by examiner

ELECTRONIC DEVICE AND METHOD FOR DETERMINING UPLINK OPERATION IN WIRELESS COMMUNICATION SYSTEM

CROSS-REFERENCE TO RELATED APPLICATION(S)

This application is a National Phase Entry of PCT International Application No. PCT/KR2019/015643, which was filed on Nov. 15, 2019, and claims priority to Korean Patent Application No. 10-2018-0144603, which was filed on Nov. 21, 2018, in the Korean Intellectual Property Office, the contents of which are incorporated herein by reference.

BACKGROUND

1. Field

Various embodiments of the present invention relate to an electronic device and method for determining an uplink operation in a wireless communication system.

2. Description of the Related Art

As various wireless services are widely used, frequency resources are gradually becoming scarce, but users of wireless services desire high-quality services with high throughput and low latency. Accordingly, in order to provide a new wireless service, a band combination (BC) technology, which means a combination of bands that may be simultaneously used in a network, is used. The BC technology supports carrier aggregation (CA) which has an effect of bandwidth spreading by allowing the UE to use multiple bands in a bundle and multi-RAT dual connectivity (MR-DC) having a plurality of connections via heterogeneous radio access technologies (RATs) in multiple bands. In the $3^{rd}$ generation partnership project (3GPP) radio access network (RAN) working group (WG) 4, a combination of bands in which self-interference may occur frequently, such as harmonics or inter-modulation distortion (IMD, is defined as difficult BC or problematic BC. In the case of a B3+N78 band combination defined as difficult BC, as an example, when uplink transmission is simultaneously performed via the B3 band, which has a range from 1710 Mhz to 1785 Mhz for uplink and a range from 1805 Mhz to 1880 Mhz for dielectric layer 140 in the frequency division scheme, and the N78 band, which has a range from 3300 Mhz to 3800 Mhz for uplink and downlink in the time division scheme, interference due to inter-modulation distortion (IMD) may occur in the downlink area of the B3 band.

The 3GPP supports single uplink operation (SUO) that divides uplink transmission into time intervals to allow only one uplink transmission to be performed within a specific time interval to thereby prevent self-interference that may occur when uplink transmission is simultaneously performed on multiple bands. When single uplink operation (SUO) is applied, the UE separates the time intervals in which uplink transmission is possible in each band, preventing two uplink transmissions, which cause self-interference, from being simultaneously performed. For this operation, the UE may transmit a single uplink operation (SUO) indication for each BC for difficult BC to the base station, together with a user equipment capability, during a network attach process. The base station allocates a time division multiplexing (TDM) configuration for a frequency division duplexing (FDD) uplink band based on the UE capability received from the UE, and provides the UE with a time division multiplexing (TDM) pattern constituted of a hybrid automatic repeat request (HARQ) offset and a subframe assignment for indicating the interval during which per-band uplink transmission is allowed via a radio resource control (RRC) connection reconfiguration message. These UE and network operations allow the UE to permanently use the single uplink operation (SUO) depending on the network's decision based on the UE capability in difficult BC.

SUMMARY

When the TDM pattern is used for transmission based on single uplink operation (SUO), uplink transmission in the FDD band may be limited to the TDM scheme. In this case, uplink transmission of the UE may be restricted according to whether a single uplink operation (SUO) is applied in the FDD band continuously using a time interval in the allowed frequency band. For example, although the FDD uplink resource is available for uplink transmission in another band, an interval when it is not used may occur. Accordingly, in an environment in which single uplink operation (SUO) is applied, the use of the uplink resources in the FDD band may be reduced.

When the single uplink operation (SUO) is permanently used in the difficult BC, the difference in capability for each UE may not be considered. In general, the channel quality that the UE may receive in a downlink band may vary according to network deployments. For example, there may be a difference in the robustness of the downlink channel against self-interference that occurs depending on the position of the UE or the network environment, and the transmission power used for uplink transmission differs depending on the position of the UE or channel environment. Thus, the level of self-interference may vary.

In various embodiments of the present invention, in an MR-DC-based 5G new radio (NR) network structure, when a UE operates in a difficult BC where self-interference occurs, it may be determined whether a single uplink operation is configured, selectively considering the operating environment of the network or UE.

According to various embodiments of the present invention, an electronic device may comprise a first communication circuit configured to provide first wireless communication using a first frequency band, a second communication circuit configured to provide second wireless communication using a second frequency band, a processor operatively connected with the first communication circuit and the second communication circuit, and a memory operatively connected with the processor and configured to store information regarding the first frequency band and the second frequency band. The memory may store instructions configured to, when executed, enable the processor to perform a communication connection with a first base station using the first communication circuit to receive a first signal from the first base station, receive a second signal from a second base station using the second communication circuit, based on the information regarding the frequency band while performing the communication connection with the first base station, select one of a single uplink operation (SUO) or a dual uplink operation (DUO), based on information obtained or measured in response to receiving the first signal or the second signal, and transmit information regarding the selected uplink operation to the first base station.

According to various embodiments of the present invention, an electronic device may comprise a first communication circuit configured to provide first wireless communication using a first frequency band, a second communication circuit configured to provide second wireless communication using a second frequency band, a processor operatively connected with the first communication circuit and the second communication circuit, and a memory operatively connected with the processor. The memory may store instructions configured to, when executed, enable the processor to perform a communication connection with a first base station using the first communication circuit, perform wireless communication in a first operation, which is one of a single uplink operation (SUO) or a dual uplink operation (DUO), with a second base station using the second communication circuit, determine whether to switch to a second operation, which is different from the first operation, based on information measured or identified using the first communication circuit or the second communication circuit while performing the first operation, and transmit a first message indicating to switch from the first operation to the second operation to the first base station based on the determination.

According to various embodiments of the present invention, a method for determining an uplink operation by an electronic device configured to perform communication with a first base station using a first frequency band and communication with a second base station using a second frequency band in a wireless communication system may comprise receiving a first signal from the first base station, using a first communication circuit, receiving a second signal from the second base station, using a second communication circuit while performing a communication connection with the first base station, selecting one of a single uplink operation (SUO) or a dual uplink operation (DUO), based on at least one of information obtained or measured in response to receiving the first signal or the second signal or second information previously configured, and transmitting information regarding the selected uplink operation to the first base station.

An electronic device and method according to various embodiments may selectively determine whether to set a single uplink operation (SUO) considering an operating environment or capability for difficult BC during transmission of a UE capability or an update process. Thus, the efficiency of use of uplink resources may be enhanced, and influence by the self-interference occurring in the downlink band depending on differences in UE capability may be directly managed.

The electronic device and method according to various embodiments may set or update a single uplink transfer parameter included in the UE capability based on the influence by single/dual uplink transmission or self-interference in difficult BC, thereby maintaining a transmission environment for a high-quality service.

BRIEF DESCRIPTION OF THE DRAWINGS

Particular preferred embodiments of the present invention and the foregoing and other aspects, features, and advantages will be apparent from the following detailed description taken in conjunction with the accompanying drawings, wherein.

DETAILED DESCRIPTION

Figure 1A:
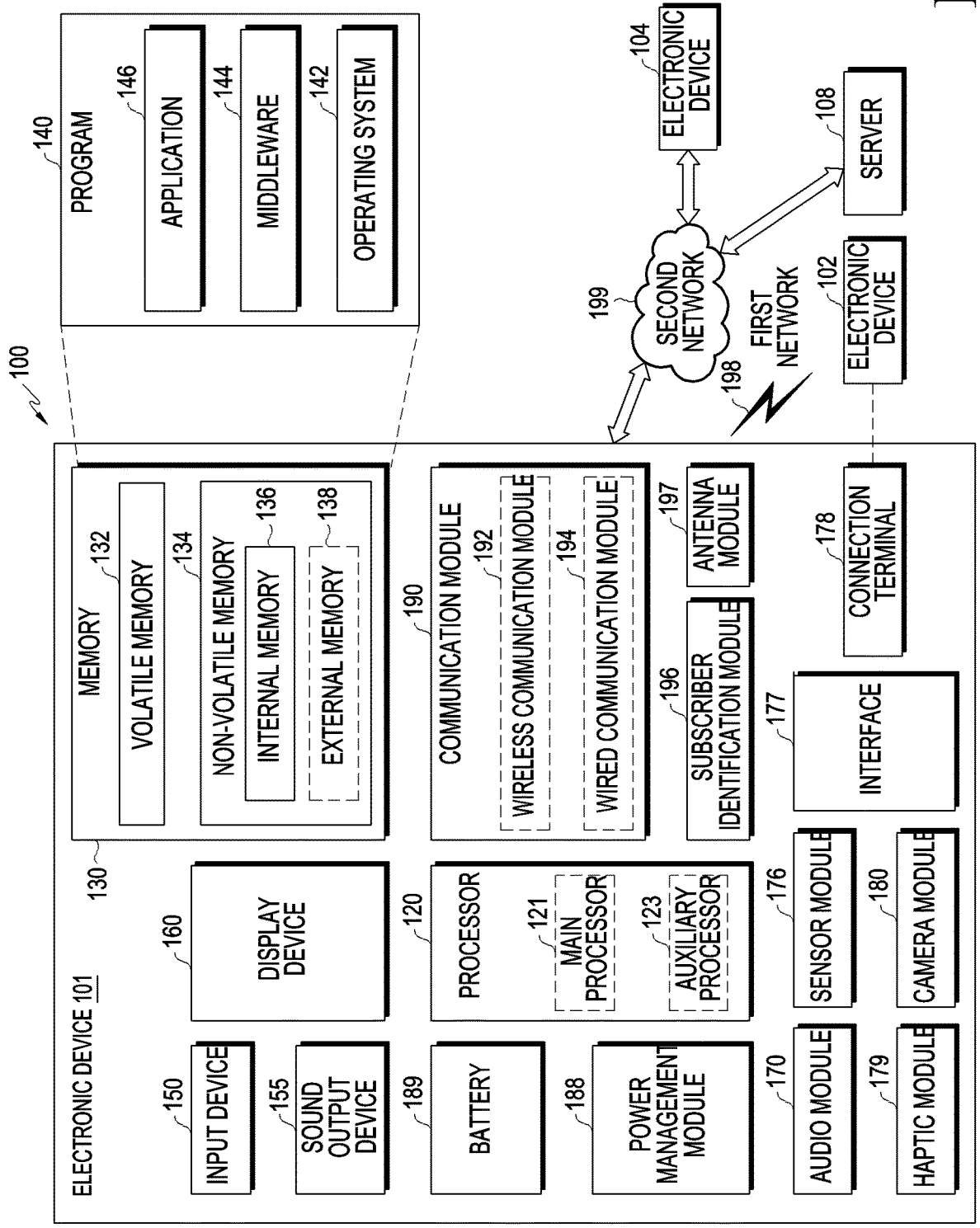
FIG. 1A is a view illustrating an electronic device in a network environment according to various embodiments of the present invention.

Hereinafter, embodiments of the present invention are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed to" in hardware. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present invention may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present invention, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment, the electronic device may be one or a combination of the above-listed devices. According to some embodiments, the electronic device may be a flexible electronic device. The electronic device disclosed herein is not limited to the above-listed devices, and may include new electronic devices depending on the development of technology.

FIG. 1A is a block diagram illustrating an electronic device 101 in a network environment 100 according to various embodiments. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 and 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 1B:
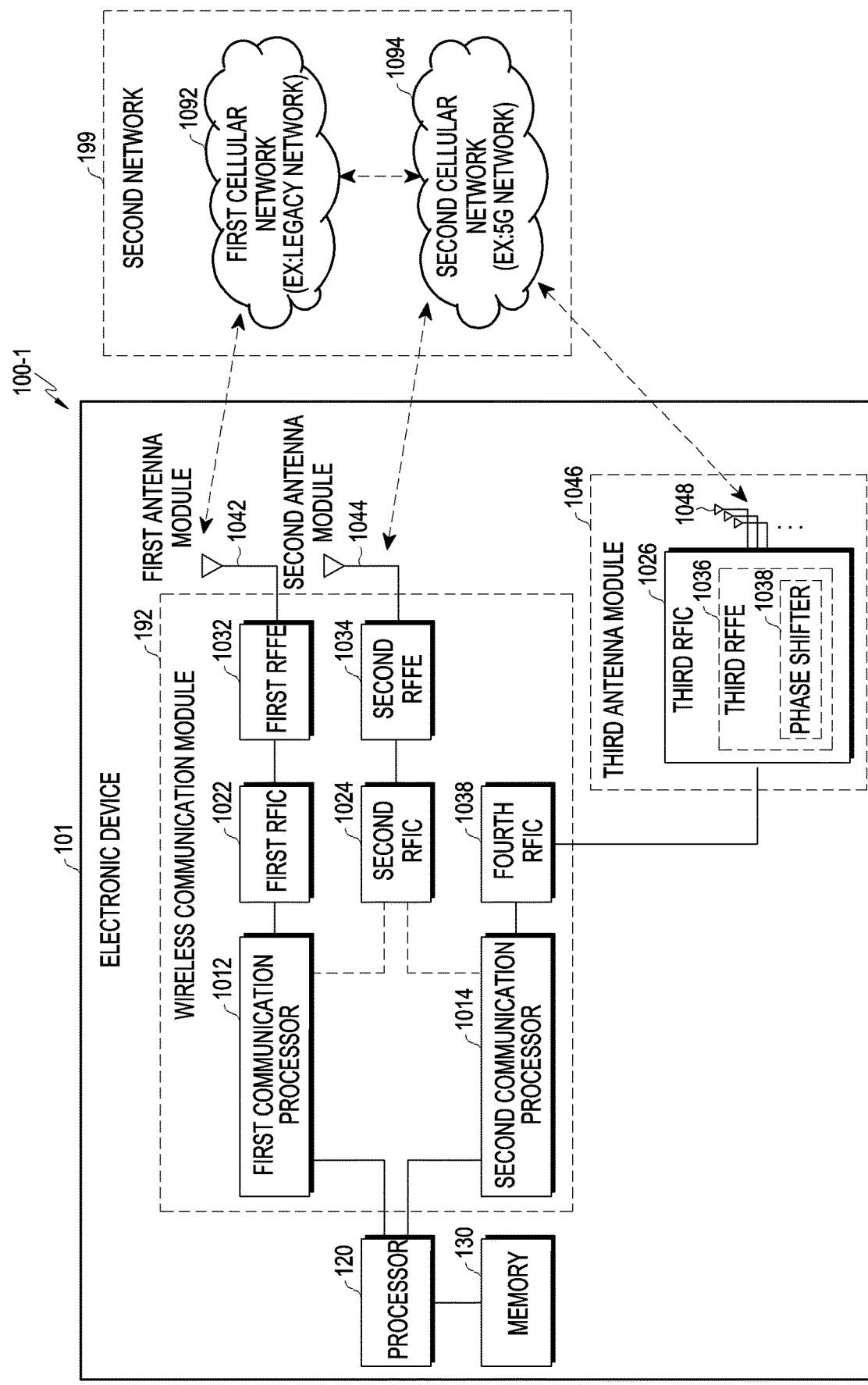
FIG. 1B is a view illustrating an electronic device in a network environment including a plurality of cellular networks according to various embodiments of the present invention.

FIG. 1B is a block diagram 100-1 of the electronic device 101 in the network environment including a plurality of cellular networks according to an embodiment. Referring to FIG. 1B, the electronic device 101 may include a first communication processor 1012, a second communication processor 1014, a first radio frequency integrated circuit (RFIC) 1022, a second RFIC 1024, a third RFIC 1026, a fourth RFIC 1028, a first radio frequency front end (RFFE) 1032, a second RFFE 1034, a first antenna module 1042, a second antenna module 1044, and an antenna 1048. The electronic device 101 may further include a processor 120 and a memory 130. The second network 199 may include a first cellular network 1092 and a second cellular network 1094. According to an embodiment, the electronic device 101 may further include at least one component among the components of FIG. 1A, and the second network 199 may further include at least one other network. According to an embodiment, the first communication processor 1012, the second communication processor 1014, the first RFIC 1022, the second RFIC 1024, the fourth RFIC 1028, the first RFFE 1032, and the second RFFE 1034 may form at least part of the wireless communication module 192. According to an embodiment, the fourth RFIC 1028 may be omitted or be included as part of the third RFIC 1026.

The first communication processor 1012 may establish a communication channel of a band that is to be used for wireless communication with the first cellular network 1092 or may support legacy network communication via the established communication channel. According to an embodiment, the first cellular network may be a legacy network that includes second generation (2G), third generation (3G), fourth generation (4G), or long-term evolution (LTE) networks. The second communication processor 1014 may establish a communication channel corresponding to a designated band (e.g., from about 6 GHz to about 60 GHz) among bands that are to be used for wireless communication with the second cellular network 1094 or may support fifth generation (5G) network communication via the established communication channel. According to an embodiment, the second cellular network 1094 may be a 5G network defined by the 3rd generation partnership project (3GPP). Additionally, according to an embodiment, the first communication processor 1012 or the second communication processor 1014 may establish a communication channel corresponding to another designated band (e.g., about 6 GHz or less) among the bands that are to be used for wireless communication with the second cellular network 1094 or may support fifth generation (5G) network communication via the established communication channel. According to an embodiment, the first communication processor 1012 and the second communication processor 1014 may be implemented in a single chip or a single package. According to an embodiment, the first communication processor 1012 or the second communication processor 1014, along with the processor 120, an assistance processor 123, or communication module 190, may be formed in a single chip or single package.

Upon transmission, the first RFIC 1022 may convert a baseband signal generated by the first communication processor 1012 into a radio frequency (RF) signal with a frequency ranging from about 700 MHz to about 3 GHz which is used by the first cellular network 1092 (e.g., a legacy network). Upon receipt, the RF signal may be obtained from the first cellular network 1092 (e.g., a legacy network) through an antenna (e.g., the first antenna module 1042) and be pre-processed via an RFFE (e.g., the first RFFE 1032). The first RFIC 1022 may convert the pre-processed RF signal into a baseband signal that may be processed by the first communication processor 1012.

Upon transmission, the second RFIC 1024 may convert the baseband signal generated by the first communication processor 1012 or the second communication processor 1014 into a Sub6-band (e.g., about 6 GHz or less) RF signal (hereinafter, "5G Sub6 RF signal") that is used by the second cellular network 1094 (e.g., a 5G network). Upon receipt, the 5G Sub6 RF signal may be obtained from the second cellular network 1094 (e.g., a 5G network) through an antenna (e.g., the second antenna module 1044) and be pre-processed via an RFFE (e.g., the second RFFE 1034). The second RFIC 1024 may convert the pre-processed 5G Sub6 RF signal into a baseband signal that may be processed by a corresponding processor of the first communication processor 1012 and the second communication processor 1014.

The third RFIC 1026 may convert the baseband signal generated by the second communication processor 1014 into a 5G Above6 band (e.g., about 6 GHz to about 60 GHz) RF signal (hereinafter, "5G Above6 RF signal") that is to be used by the second cellular network 1094 (e.g., a 5G network). Upon receipt, the 5G Above6 RF signal may be obtained from the second cellular network 1094 (e.g., a 5G network) through an antenna (e.g., the antenna 1048) and be pre-processed via the third RFFE 1036. The third RFIC 1026 may convert the pre-processed 5G Above6 RF signal into a baseband signal that may be processed by the second communication processor 1014. According to an embodiment, the third RFFE 1036 may be formed as part of the third RFIC 1026.

According to an embodiment, the electronic device 101 may include the fourth RFIC 1028 separately from, or as at least part of, the third RFIC 1026. In this case, the fourth RFIC 1028 may convert the baseband signal generated by the second communication processor 1014 into an intermediate frequency band (e.g., from about 9 GHz to about 11 GHz) RF signal (hereinafter, "IF signal") and transfer the IF signal to the third RFIC 1026. The third RFIC 1026 may convert the IF signal into a 5G Above6 RF signal. Upon receipt, the 5G Above6 RF signal may be received from the second cellular network 1094 (e.g., a 5G network) through an antenna (e.g., the antenna 1048) and be converted into an IF signal by the third RFIC 1026. The fourth RFIC 1028 may convert the IF signal into a baseband signal that may be processed by the second communication processor 1014.

According to an embodiment, the first RFIC 1022 and the second RFIC 1024 may be implemented as at least part of a single chip or single package. According to an embodiment, the first RFFE 1032 and the second RFFE 1034 may be implemented as at least part of a single chip or single package. According to an embodiment, at least one of the first antenna module 1042 or the second antenna module 1044 may be omitted or be combined with another antenna module to process multi-band RF signals.

According to an embodiment, the third RFIC 1026 and the antenna 1048 may be disposed on the same substrate to form the third antenna module 1046. For example, the wireless communication module 192 or the processor 120 may be disposed on a first substrate (e.g., a main painted circuit board (PCB)). In this case, the third RFIC 1026 and the antenna 1048, respectively, may be disposed on one area (e.g., the bottom) and another (e.g., the top) of a second substrate (e.g., a sub PCB) which is provided separately from the first substrate, forming the third antenna module 1046. Placing the third RFIC 1026 and the antenna 1048 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 1094 (e.g., a 5G network).

According to an embodiment, the antenna 1048 may be formed as an antenna array which includes a plurality of antenna elements available for beamforming. In this case, the third RFIC 1026 may include a plurality of phase shifters 1038 corresponding to the plurality of antenna elements, as part of the third RFFE 1036. Upon transmission, the plurality of phase shifters 1038 may change the phase of the 5G Above6 RF signal which is to be transmitted to the outside (e.g., a 5G network base station) of the electronic device 101 via their respective corresponding antenna elements. Upon receipt, the plurality of phase shifters 1038 may change the phase of the 5G Above6 RF signal received from the outside to the same or substantially the same phase via their respective corresponding antenna elements. This enables transmission or reception via beamforming between the electronic device 101 and the outside.

The second cellular network 1094 (e.g., a 5G network) may be operated independently (e.g., as standalone (SA)) from, or in connection (e.g., as non-standalone (NSA)) with the first cellular network 1092 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first communication processor 1012, or the second communication processor 1014).

Figure 2A:
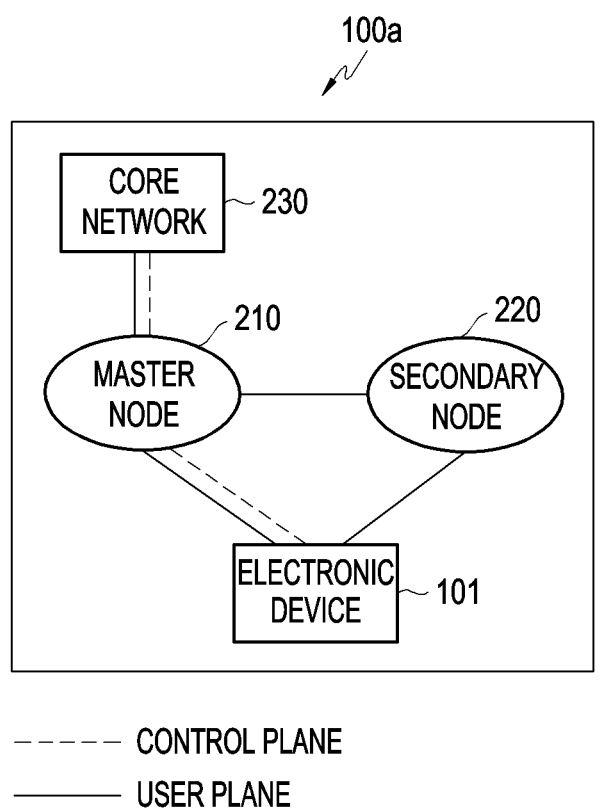
FIGS. 2A, 2B, and 2C are views illustrating wireless communication systems providing legacy communication and/or 5G communication networks according to various embodiments of the present invention.
Figure 2B:
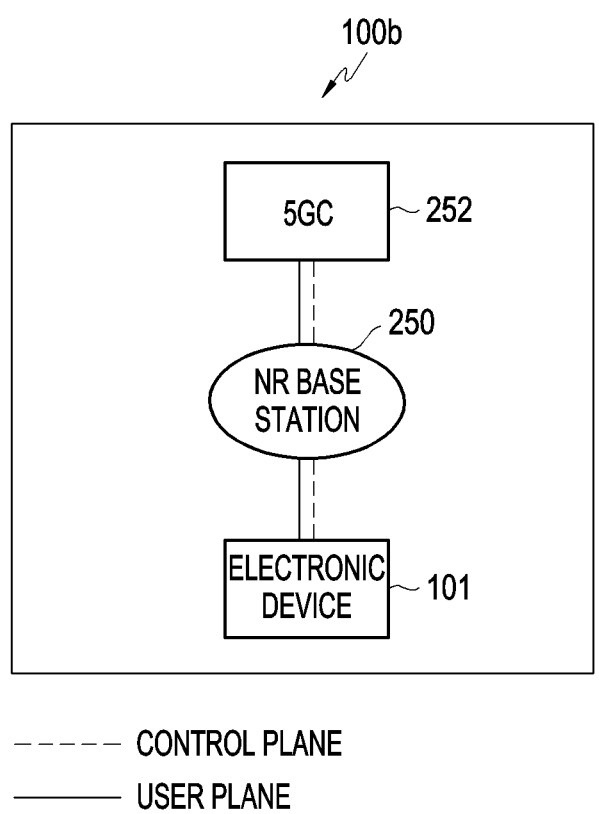
Figure 2C:
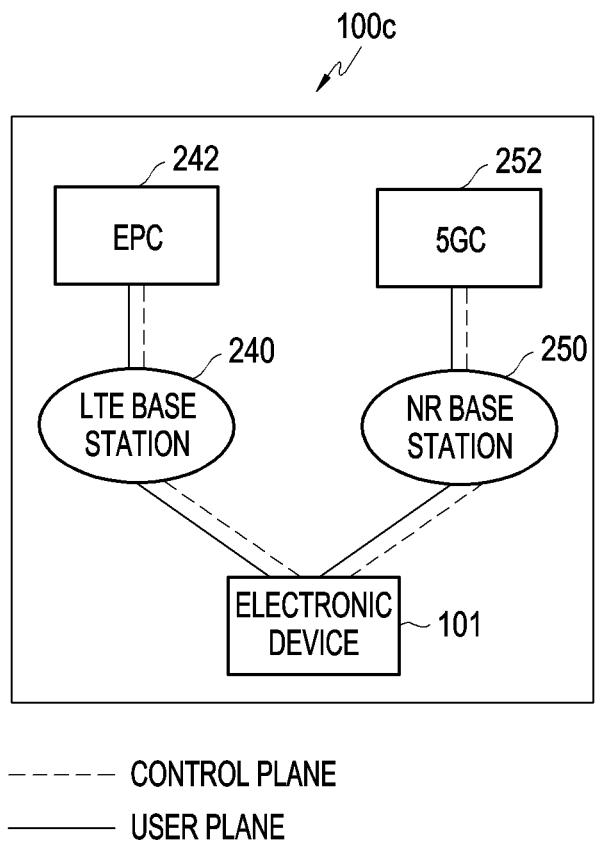

FIGS. 2A, 2B, and 2C are views illustrating wireless communication systems providing legacy communication and/or 5G communication networks according to various embodiments. Referring to FIGS. 2A to 2C, the network environment 100a to 100c may include at least one of a legacy network and a 5G network. The legacy network may include, e.g., a 3GPP-standard 4G or LTE base station 240 (e.g., an eNodeB (eNB)) that supports radio access with the electronic device 101 and an evolved packet core (EPC) 242 that manages 4G communication. The 5G network may include, e.g., a new radio (NR) base station 250 (e.g., a gNodeB (gNB)) that supports radio access with the electronic device 101 and a 5th generation core (5GC) 252 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 230 (e.g., the EPC 242).

Referring to FIG. 2A, according to an embodiment, the electronic device 101 may transmit or receive at least one of a control message or user data to/from at least part (e.g., the NR base station 250 or 5GC 252) of the 5G network via at least part (e.g., the LTE base station 240 or EPC 242) of the legacy network.

According to an embodiment, the network environment 100a may include a network environment that provides wireless communication dual connectivity (DC) to the LTE base station 240 and the NR base station 250 and transmits or receives control messages to/from the electronic device 101 via one core network 230 of the EPC 242 or the 5GC 252.

According to an embodiment, in the DC environment, one of the LTE base station 240 or the NR base station 250 may operate as a master node (MN) 210, and the other as a secondary node (SN) 220. The MN 210 may be connected with the core network 230 to transmit or receive control messages. The MN 210 and the SN 220 may be connected with each other via a network interface to transmit or receive messages related to radio resource (e.g., communication channel) management therebetween.

According to an embodiment, the MN 210 may include the LTE base station 240, the SN 220 may include the NR base station 250, and the core network 230 may include the EPC 242. For example, control messages may be transmitted/received via the LTE base station 240 and the EPC 242, and user data may be transmitted/received via the LTE base station 240 and the NR base station 250.

According to an embodiment, the MN 210 may include the NR base station 250, and the SN 220 may include the LTE base station 240, and the core network 230 may include the 5GC 252. For example, control messages may be transmitted/received via the LTE base station 240 and the EPC 242, and user data may be transmitted/received via the LTE base station 240 or the NR base station 250.

According to an embodiment, the MN 210 may include the NR base station 250, and the SN 220 may include the NR base station 250, and the core network 230 may include the 5GC 252. For example, control messages may be transmitted/received via the NR base station 350 and the 5GC 252, and user data may be transmitted/received via a first NR base station (e.g., the NR base station 250) and a second NR base station (e.g., the NR base station 250).

Referring to FIG. 2B, according to an embodiment, the 5G network may include the NR base station 250 and the 5GC 252 and transmit or receive control messages and user data independently from the electronic device 101.

Referring to FIG. 2C, according to an embodiment, the legacy network and the 5G network each may provide data transmission/reception independently. For example, the electronic device 101 and the EPC 242 may transmit or receive control messages and user data via the LTE base station 240. As another example, the electronic device 101 and the 5GC 252 may transmit or receive control messages and user data via the NR base station 250.

According to an embodiment, the electronic device 101 may be registered in at least one of the EPC 242 or the 5GC 252 to transmit or receive control messages.

According to an embodiment, the EPC 242 or the 5GC 252 may interwork with each other to manage communication for the electronic device 101. For example, mobility information for the electronic device 101 may be transmitted or received via the interface between the EPC 242 and the 5GC 252.

Figure 3:
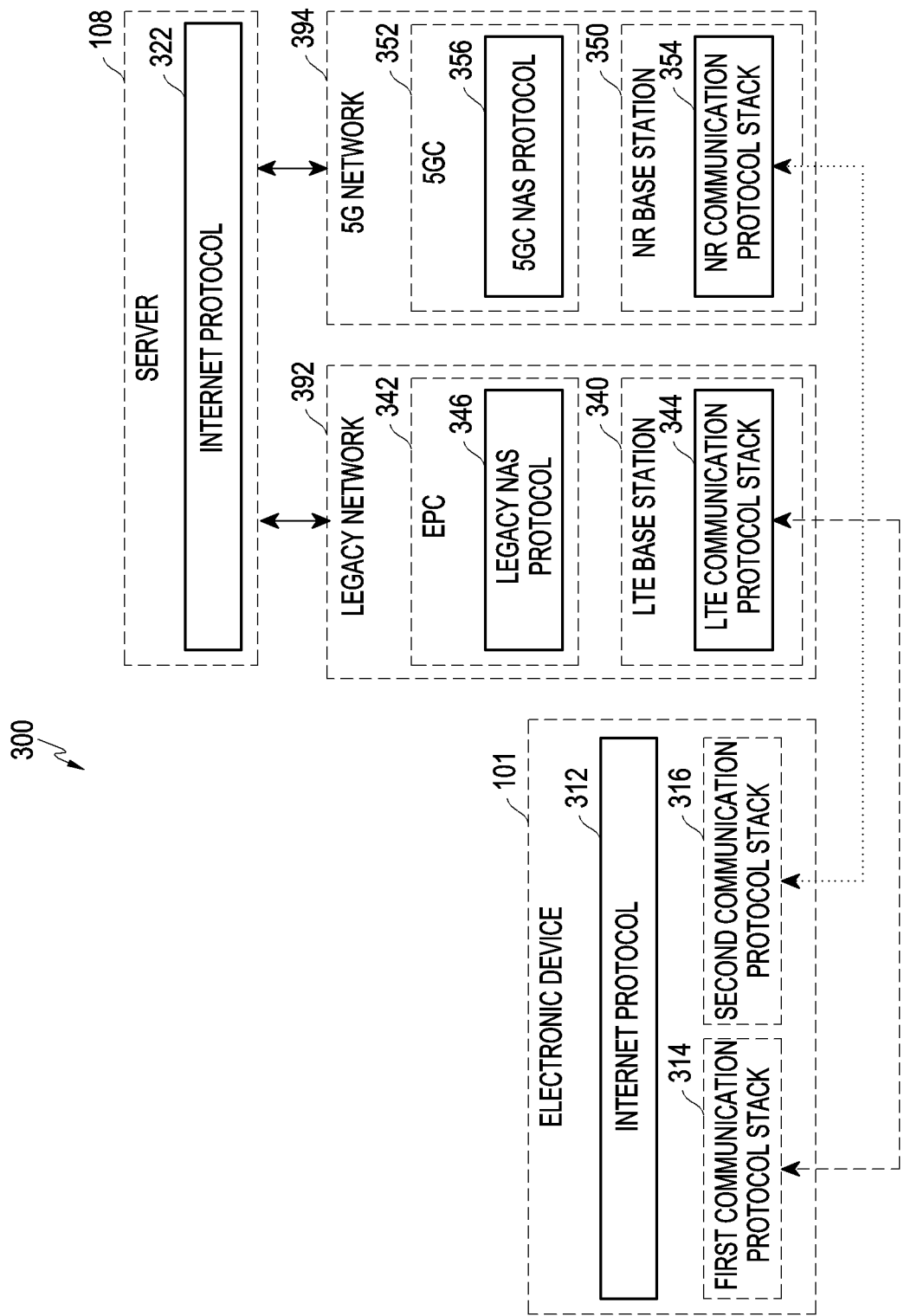
FIG. 3 is a view illustrating a protocol stack structure of a network 100 for legacy communication and/or 5G communication according to various embodiments of the present invention.

FIG. 3 is a view illustrating a protocol stack structure of a network 300 for legacy communication and/or 5G communication according to various embodiments. According to the illustrated embodiment, the network 300 may include an electronic device 101, a server 108, a legacy network 392, and a 5G network 394.

The electronic device 101 may include an Internet protocol 312, a first communication protocol stack 314, and a second communication protocol stack 316. The electronic device 101 may communicate with a server 108 through a legacy network 392 and/or a 5G network 394.

According to an embodiment, the electronic device 101 may perform Internet communication associated with the server 108 using the Internet protocol 312 (e.g., TCP, UDP, and/or IP). The Internet protocol 312 may be executed by, e.g., a main processor (e.g., the main processor 121 of FIG. 1) included in the electronic device 101.

According to another embodiment, the electronic device 101 may wirelessly communicate with the legacy network 392 using the first communication protocol stack 314. According to another embodiment, the electronic device 101 may wirelessly communicate with the 5G network 394 using the second communication protocol stack 316. The first communication protocol stack 314 and the second communication protocol stack 316 may be executed by, e.g., one or more communication processors (e.g., the wireless communication module 192 of FIG. 1) included in the electronic device 101.

The server 108 may include an Internet protocol 322. The server 108 may transmit/receive data related to the Internet protocol 322 to/from the electronic device 101 through the legacy network 392 and/or the 5G network 394. According to an embodiment, the server 108 may include a cloud computing server that exists outside the legacy network 392 or 5G network 394. In another embodiment, the server 108 may include an edge computing server (or a mobile edge computing (MEC) server) located inside at least one of the legacy network 392 or the 5G network 394.

The legacy network 392 may include an LTE base station 340 and an EPC 342. The LTE base station 340 may include an LTE communication protocol stack 344. The EPC 342 may include a legacy non-access stratum (NAS) protocol 346. The legacy network 392 may perform LTE wireless communication with the electronic device 101 using the LTE communication protocol stack 344 and the legacy NAS protocol 346.

The 5G network 394 may include an NR base station 350 and a 5GC 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving control messages and a user plane protocol for transmitting and receiving user data. The control messages may include, e.g., messages related to at least one of security control, bearer setup, authentication, registration, or mobility management. The user data may include data other than control messages, for example.

According to an embodiment, the control plane protocol and the user plane protocol may include physical (PHY), medium access control (MAC), radio link control (RLC), or packet data convergence protocol (PDCP) layers. The PHY layer may, e.g., channel-code and modulate the data received from a higher layer (e.g., the MAC layer) and transmit it via a radio channel and may demodulate and decode the data received via a radio channel and deliver it to the higher layer. The PHY layer included in the second communication protocol stack 316 and the NR communication protocol stack 354 may further perform an operation related to beam forming. The MAC layer may logically/physically map to a radio channel to transmit/receive data and perform a hybrid automatic repeat request (HARQ) for error correction. The RLC layer may perform concatenation, segmentation, or reassembly of data, and may identify the order of data, rearrange data, or redundancy-check data, for example. The PDCP layer may perform operations related to, e.g., ciphering and data integrity of control data and user data. The second communication protocol stack 316 and the NR communication protocol stack 354 may further include a service data adaptation protocol (SDAP). The SDAP may manage the allocation of radio bearers based on the quality-of-service (QoS) of user data.

According to various embodiments, the control plane protocol may include a radio resource control (RRC) layer and a non-access stratum (NAS) layer. The RRC layer may process control data related to radio bearer setup, paging, or mobility management, for example. The NAS may handle control messages related to, e.g., authentication, registration, and mobility management.

Figure 4:
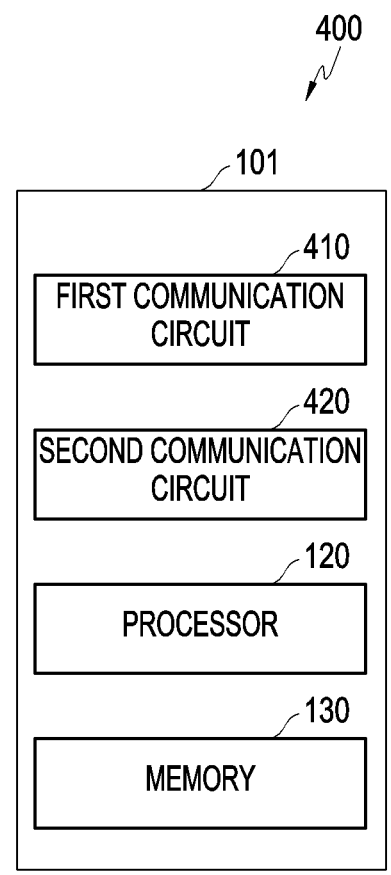
FIG. 4 is a block diagram illustrating an electronic device according to various embodiments of the present invention.

FIG. 4 is a block diagram 400 illustrating an electronic device 101 according to an embodiment of the present invention. The electronic device 101 may be a device (e.g., a smartphone or tablet computer) that determines an uplink operation in the process of attaching to a network or determines an uplink operation during a multi-rat dual connectivity (MR-DC) operation after attaching to the network to communicate with the network and may include a first communication circuit 410, a second communication circuit 420, a processor 120, or a memory 130.

According to various embodiments of the present invention, the first communication circuit 410 may provide first wireless communication using a first frequency band, and the second communication circuit 420 may provide second wireless communication using a second frequency band.

According to various embodiments of the present invention, the processor 120 may be operatively connected to the first communication circuit 410 and the second communication circuit 420.

According to various embodiments of the present invention, the memory 130 may be operatively connected to the processor 120 and may store information about the first frequency band and the second frequency band. The first frequency band and the second frequency band may be included in the band combination defined in $3^{rd}$ generation partnership project (3GPP) WG RAN4.

According to various embodiments of the present invention, the memory 130 may store instructions which, when executed, control the processor 120 to perform various operations to determine an uplink operation during a process for attaching to a network. For example, the processor 120 may perform a communication connection with a first base station using the first communication circuit 410 and receive a first signal from the first base station. The first base station may be a base station (e.g., an eNB or the LTE base station 340 of FIG. 3) that provides a wireless connection between the electronic device 101 and the LTE network. The processor 120 may receive a second signal from the second base station using the second communication circuit 420 while performing a communication connection with the first base station. The second base station may be a base station (e.g., a gNB or the NR base station 350 of FIG. 3) that provides a wireless connection between the electronic device 101 and the 5G network.

The processor 120 may determine an uplink operation based on at least one of first information acquired or measured in response to receiving the first signal or the second signal or preconfigured second information. The first signal and the second signal may correspond to at least one of a synchronization signal or a reference signal transmitted from the first base station or the second base station.

The first information is information measured or identified on the NR cell of the electronic device 101 in the process of performing a network attach procedure and may include at least one of synchronization signal block (SSB) measurement information, system information block (SIB) identification information, or self-interference measurement information. According to various embodiments of the present invention, when the electronic device 101 receives the presence of a heterogeneous cell accessible from the network in the process of accessing a master node (MN), the electronic device 101 may previously measure or identify the first information about difficult BC of the supportable band combination (BC), estimate whether self-interference occurs due to use of the band based on the result of measurement/identification, and determine single uplink operation (SUO) or dual uplink operation (DUO) considering the result of estimation. For example, as the NR band in which the processor 120 measures or identifies the first information, the entire difficult BC defined in 3GPP RAN4 may be considered or, depending on the possibility of combination with the band used by the currently attached master node (MN), it may be limited to part of the entire difficult BC.

According to various embodiments of the present invention, the processor 120 may compare the strength of the first signal and a first threshold designated as a reference for determining the strength of the signal and select one of a single uplink operation or a dual uplink operation based on the result of comparison result. For example, the processor 120 may measure the strength of the downlink received signal using the SSB frequency transmitted in the LTE or NR band of difficult BC that the electronic device 101 may support and, based on the measurement result, estimate the degree of influence by self-interference that may occur in the downlink band and determine whether to perform a single uplink operation. When the strength of the first signal is greater than the first threshold, the processor 120 may estimate that the downlink channel condition is good and is robust against self-interference, or that the uplink transmission power is low and thus the self-interference generated in the downlink band is low in which case since a single uplink operation (SUO) need not be performed, a dual uplink operation (DUO) may be chosen. When the strength of the first signal is smaller than the first threshold, the processor 120 may estimate that the magnitude of self-interference occurring in the downlink band is relatively large, and may select a single uplink operation (SUO).

According to various embodiments of the present invention, the processor 120 may determine a center frequency of the first frequency based on the first signal, determine a center frequency of the second frequency based on the second signal, and select one of a single uplink operation or dual uplink operation based on at least a portion of the center frequency of the first frequency or the center frequency of the second frequency. For example, the processor 120 may determine whether the center frequency of the first frequency is a harmonic frequency of the center frequency of the second frequency and, based on the determination result, select one of a single uplink operation or a dual uplink operation. In one embodiment, the processor 120 may identify system information transmitted through a broadcast channel, estimate whether self-interference occurs due to use of the corresponding band, and determine whether to perform a single uplink operation based on the result of estimation.

According to various embodiments of the present invention, the processor 120 may estimate whether self-interference occurs due to use of the corresponding band through separate signaling and may determine a single uplink operation (SUO) or dual uplink operation (DUO) considering the result of estimation.

The second information is information that may be obtained without separate measurement or identification and may include at least one of information on the frequency band stored in the memory 130 or information on the characteristics of the service that the electronic device 101 is to use. According to various embodiments of the present invention, the processor 120 may determine a single uplink operation (SUO) or a dual uplink operation (DUO) based on the information on the frequency band. For example, the information on the frequency band may include a single uplink operation (SUO) preference value for difficult BCs supported by the electronic device 101, and the processor 120 may determine whether to perform a single uplink operation (SUO) based on the single uplink operation (SUO) preference value. According to various embodiments of the present invention, the processor 120 may determine a single uplink operation (SUO) or a dual uplink operation (DUO) based on the information about the characteristics of the service that the electronic device 101 is to use. For example, the service characteristic may mean whether the service intended to be used by the electronic device 101 is a downlink-centered service or an uplink-centered service. In the case of a downlink-centered service in which traffic is intensively generated in the downlink path, uplink traffic is relatively small compared to downlink traffic, and a single uplink operation (SUO) may be determined to be performed to stably transmit downlink hybrid automatic repeat request (HARQ) feedback.

The processor 120 may transmit information on the determined uplink operation to the first base station. The information on the uplink operation may be transmitted to the first base station using UE capability transmission. For example, if the processor 120 determines to perform a single uplink operation (SUO) or a dual uplink operation (DUO), the processor 120 may set a single uplink operation (SUO) indication bit of the UE capability based on the determination.

According to various embodiments of the present invention, the memory 130 may store instructions which, when executed, control the processor 120 to perform various operations to determine whether to switch the uplink operation after attaching to the network. For example, the processor 120 may perform wireless communication with the first base station using the first communication circuit 410. The first base station may be a base station (e.g., an eNB or the LTE base station 340 of FIG. 3) that provides a wireless connection between the electronic device 101 and the LTE network. The processor 120 may perform wireless communication with the second base station using the second communication circuit 420 in a first operation. The second base station may be a base station (e.g., a gNB or the NR base station 350 of FIG. 3) that provides a wireless connection between the electronic device 101 and the 5G NR network.

The processor 120 may determine whether to switch from the first operation to a second operation based on information measured or identified while performing the first operation. The first operation may be a single uplink operation (SUO) or a dual uplink operation (DUO). The second operation may be one different from the first operation, of a single uplink operation (SUO) or a dual uplink operation (DUO). The information measured or identified while performing the first operation may include at least one of downlink channel measurement information, per-transmission path uplink transmission power information, hybrid automatic repeat and request (HARQ) process result information, per-data path uplink buffer status information, or new radio supplementary uplink (NR SUL) support information.

According to various embodiments of the present invention, the processor 120 may measure the strength of the signal received from the first base station while performing wireless communication based on the single uplink operation (SUO) with the second base station and determine whether to switch from the single uplink operation to the dual uplink operation based on the result of comparing the signal strength with a threshold. For example, the processor 120 may measure the downlink channel of the electronic device 101 operating in multi RAT-dual connectivity (MR-DC) in the difficult BC and, based on the measurement result, determine whether to switch from the single uplink operation to the dual uplink operation. The signal strength may be measured using at least one of the signal to noise ratio (SNR), the signal to interference plus noise ratio (SINR), or the reference signal received power (RSRP). When the signal strength is greater than the threshold, the processor 120 may estimate that the degree of influence by self-interference caused by uplink transmission is relatively small, and in this case, the processor 120 may determine to switch to the dual uplink operation (DUO) since the single uplink operation (SUO) need not be performed.

According to various embodiments of the present invention, the processor 120 may estimate the degree of influence by the self-interference occurring on the downlink channel based on the uplink transmission power of the electronic device 101 and determine whether to switch from the single uplink operation to the dual uplink operation considering the estimation result. For example, if the uplink transmission power of the electronic device 101 is less than a threshold, the processor 120 may determine that it is not necessary to perform the single uplink operation because the magnitude of self-interference affecting the downlink channel is relatively small and thus determine to switch to the dual uplink operation. The processor 120 may estimate the distance to the base station based on per-transmission path power headroom report (PHR) information and, when the estimated distance is a threshold or more, determine to perform the single uplink operation.

According to various embodiments of the present invention, the processor 120 may measure the state of communication with the second base station while performing wireless communication based on the dual uplink operation (DUO) with the second base station and may determine whether to switch from the dual uplink operation to the single uplink operation based on the result of measurement. The communication state may be measured based on at least one of the number of retransmissions by the first base station, the reception failure rate of the electronic device 101, or the bit error rate (BER) of the packet received from the first base station. For example, the processor 120 may measure the result of a hybrid automatic repeat and request (HARQ) process in the downlink channel of the electronic device 101 operating in multi RAT-dual connectivity (MR-DC) in the difficult BC and may determine whether to perform the single uplink operation based on the measurement result history. If at least one of the number of retransmissions of the downlink transport block, the proportion of the downlink transport blocks whose reception has failed, or the bit error rate (BER) of the received downlink transport block according to the result of measurement exceeds a threshold, the processor 120 may determine to switch to the single uplink operation (SUO) to reduce influence by self-interference.

According to various embodiments of the present invention, the processor 120 may determine the uplink buffer state for each data path, and determine whether to perform a single uplink operation based on the determination result. For example, the processor 120 may determine that traffic is asymmetrically concentrated only on a specific transmission path based on the state of the uplink buffer for each data path, and in this case, since data transmission may be limited upon applying the time division multiplexing (TDM) pattern due to the single uplink operation, the processor 120 may determine to perform the dual uplink operation (DUO).

According to various embodiments of the present invention, the processor 120 may identify whether the second base station supports a supplementary uplink (SUL) band based on the relationship between the first frequency band and the second frequency band and, based on the result of identification, determine to switch from the single uplink operation (SUO) to the dual uplink operation (DUO) and perform it. The processor 120 may receive information about whether the second base station supports the SUL band from the first base station, using the first communication circuit 410. For example, if the supplementary uplink (SUL) band is additionally supported instead of the new radio (NR) band of difficult BC, use of the SUL band allows influence by self-interference to be avoided. Thus, the processor 120 may determine that it is appropriate to perform the dual uplink operation (DUO) instead of the single uplink operation (SUO) and determine to perform the dual uplink operation (DUO) by not setting the single uplink operation indication bit of the UE capability. If it is instructed to use the supplementary uplink (SUL) band by an uplink control indication (UCI) or another method, the processor 120 may identify whether to support or allow the SUL in the NR cell and then change to perform the dual uplink operation (DUO) by resetting the single uplink operation indication bit via updating the UE capability. To identify whether the new radio supplementary uplink (NR SUL) is supported, the processor 120 may identify the history of prior use of the multi-RAT-dual connectivity (MR-DC) via the difficult BC on the corresponding master node (MN) during the network attach process and determine whether to set the single uplink operation indication bit based on the result of identification.

The processor 120 may transmit, to the first base station, a first message indicating to switch from the first operation to the second operation based on the determination result. The first message may be transmitted to the first base station through UE capability update. For example, upon determining to switch to the dual uplink operation (DUO) during the single uplink operation (SUO) (or switch to the single uplink operation during the dual uplink operation), the processor 120 may update the single uplink operation (SUO) indication bit of the UE capability based on the determination and transmit the same.

According to an embodiment, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operatively connected with the processor 120 and configured to store information regarding the first frequency band and the second frequency band. The memory 130 may store instructions configured to, when executed, enable the processor 120 to perform a communication connection with a first base station using the first communication circuit 410 to receive a first signal from the first base station, receive a second signal from a second base station using the second communication circuit 420, based on the information regarding the frequency band while performing the communication connection with the first base station, select one of a single uplink operation (SUO) or a dual uplink operation (DUO), based on information obtained or measured in response to receiving the first signal or the second signal, and transmit information regarding the selected uplink operation to the first base station.

According to various embodiments of the present invention, the first frequency band and the second frequency band may be included in a problematic band combination as defined by 3rd generation partnership project (3GPP) WG RAN4.

According to various embodiments of the present invention, the first signal and the second signal may include at least one of a synchronization signal and a reference signal.

According to various embodiments of the present invention, the instructions may be configured to enable the processor 120 to transmit the information regarding the uplink operation to the first base station using user equipment (UE) capability transmission.

According to various embodiments of the present invention, the instructions may be configured to enable the processor 120 to compare a strength of the first signal with a first threshold and select one of the single uplink operation (SUO) or the dual uplink operation (DUO) based on a result of the comparison.

According to various embodiments of the present invention, the instructions may be configured to enable the processor 120 to determine a center frequency of the first frequency based on the first signal, determine a center frequency of the second frequency based on the second signal, and select one of the single uplink operation (SUO) or the dual uplink operation (DUO) based on at least part of the center frequency of the first frequency or the center frequency of the second frequency.

According to various embodiments of the present invention, the center frequency of the first frequency may be a harmonic frequency of the center frequency of the second frequency.

According to an embodiment, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operatively connected with the processor 120 and configured to store information regarding the first frequency band and the second frequency band. The memory 130 may store instructions configured to, when executed, enable the processor 120 to perform a communication connection with a first base station using the first communication circuit 410 to receive a first signal from the first base station, receive a second signal from a second base station using the second communication circuit 420, based on the information regarding the frequency band while performing the communication connection with the first base station, compare a strength of the first signal with a first threshold, select one of a single uplink operation (SUO) or a dual uplink operation (DUO), based on a result of the comparison, and transmit information regarding the selected uplink operation to the first base station.

According to an embodiment, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operatively connected with the processor 120 and configured to store information regarding the first frequency band and the second frequency band. The memory 130 may store instructions configured to, when executed, enable the processor 120 to perform a communication connection with a first base station using the first communication circuit 410 to receive a first signal from the first base station, determine a center frequency of the first frequency based on the first signal, receive a second signal from a second base station using the second communication circuit 420, based on the information regarding the frequency band while performing the communication connection, determine a center frequency of the second frequency based on the second signal, select one of a single uplink operation (SUO) or a dual uplink operation (DUO), based on at least part of the center frequency of the first frequency or the center frequency of the second frequency, and transmit information regarding the selected uplink operation to the first base station.

According to various embodiments of the present invention, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operatively connected with the processor 120. The memory 130 may store instructions configured to, when executed, enable the processor 120 to perform a communication connection with a first base station using the first communication circuit 410, perform wireless communication in a first operation, which is one of a single uplink operation (SUO) or a dual uplink operation (DUO), with a second base station using the second communication circuit 420, determine whether to switch to a second operation, which is different from the first operation, based on information measured or identified using the first communication circuit 410 or the second communication circuit 420 while performing the first operation, and transmit a first message indicating to switch from the first operation to the second operation to the first base station based on the determination.

According to various embodiments of the present invention, the instructions may be configured to enable the processor 120 to transmit the first message to the first base station using user equipment (UE) capability update.

According to various embodiments of the present invention, the first operation is the single uplink operation (SUO), and the second operation is the dual uplink operation (DUO). The instructions may be configured to enable the processor 120 to measure a strength of a signal received from the first base station while performing the single uplink operation, compare the strength of the signal with a threshold, and transmit the first message to the first base station based on a result of the comparison.

According to various embodiments of the present invention, the first operation is the dual uplink operation (DUO), and the second operation is the single uplink operation (SUO). The instructions may be configured to enable the processor 120 to measure a communication status with the second base station based on at least one of a number of retransmissions of the first base station, a reception failure rate of the electronic device, or a bit error rate (BER) of a packet received from the first base station, during the dual uplink operation, and transmit the first message to the first base station based on a result of the measurement.

According to various embodiments of the present invention, the communication state measurement may be performed based on at least one of the number of retransmissions by the first base station, the reception failure rate of the electronic device, or the bit error rate (BER) of the packet received from the first base station.

According to various embodiments of the present invention, the first operation is the single uplink operation (SUO), and the second operation is the dual uplink operation (DUO). The instructions may be configured to enable the processor 120 to identify whether the second base station supports a supplementary uplink (SUL) band based on at least part of a relationship between the first frequency band and the second frequency band, and transmit the first message to the first base station based on a result of the identification.

According to various embodiments of the present invention, the instructions may be configured to enable the processor 120 to receive information about whether the second base station supports the SUL band from the first base station using the first communication circuit 410.

According to an embodiment, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operatively connected with the processor 120. The memory 130 may store instructions executed to enable the processor 120 to perform a communication connection with a first base station using the first communication circuit 410, perform wireless communication based on a single uplink operation (SUO) with a second base station, measure a strength of a signal received from the first base station during the single uplink operation, compare the strength of the signal with a threshold, and transmit a first message indicating to switch from the single uplink operation to the dual uplink operation (DUO) to the first base station based on a result of the comparison.

According to various embodiments of the present invention, the instructions may enable the processor 120 to transmit the first message to the first base station when the strength of the signal is the threshold or more as a result of the comparison.

According to various embodiments of the present invention, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operatively connected with the processor 120. The memory 130 may store instructions executed to enable the processor 120 to perform a communication connection with a first base station using the first communication circuit 410, perform wireless communication based on a dual uplink operation (DUO) with a second base station using the second communication circuit 420, measure a communication status with the second base station during the dual uplink operation, and transmit a first message indicating to switch from the dual uplink operation to a single uplink operation (SUO) to the first base station based on a result of the measurement.

According to various embodiments of the present invention, the instructions may enable the processor 120 to transmit the first message to the first base station when the result of the measurement is a first threshold or more.

According to an embodiment, an electronic device 101 may comprise a first communication circuit 410 configured to provide first wireless communication using a first frequency band, a second communication circuit 420 configured to provide second wireless communication using a second frequency band, a processor 120 operatively connected with the first communication circuit 410 and the second communication circuit 420, and a memory 130 operative connected with the processor 120. The memory 130 may store instructions executed to enable the processor 120 to perform wireless communication with a first base station using the first communication circuit 410, perform wireless communication with a second base station using the second communication circuit 420, identify whether the second base station supports a supplementary uplink (SUL) band based on at least part of a relationship between the first frequency band and the second frequency band, and transmit a first message indicating to switch from the single uplink operation to the dual uplink operation (DUO) to the first base station based on a result of the identification.

Figure 5:
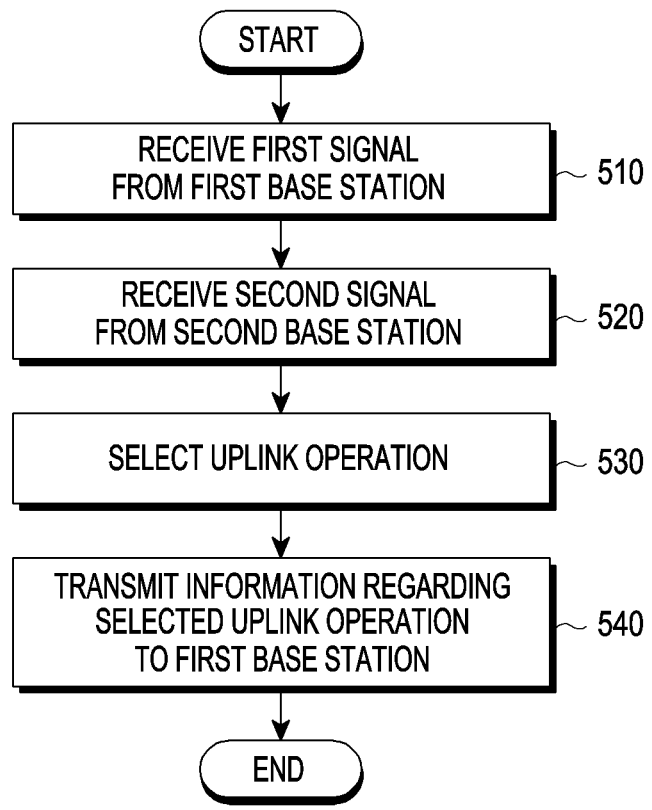
FIG. 5 is a flowchart illustrating a method of determining an uplink operation when an electronic device transmits a UE capability according to various embodiments of the present invention.

FIG. 5 is a flowchart illustrating a method of determining an uplink operation when an electronic device 101 transmits a UE capability according to various embodiments of the present invention. According to an embodiment, the electronic device 101 may determine an uplink operation upon attaching to a network, set a single uplink operation indication bit based on the determination, and transmit it to the base station via transmission of a UE capability.

Referring to FIG. 5, in operation 510, the electronic device 101 may receive a first signal from a first base station using the first communication circuit 410. The first base station may be a base station (e.g., an eNB or the LTE base station 340 of FIG. 3) that provides a wireless connection between the electronic device 101 and the LTE network.

In operation 520, the electronic device 101 may receive a second signal from the second base station using the second communication circuit 420 while performing a communication connection with the first base station. The second base station may be a base station (e.g., a gNB or the NR base station 350 of FIG. 3) that provides a wireless connection between the electronic device 101 and the 5G NR network.

In operation 530, the electronic device 101 may determine an uplink operation based on at least one of first information acquired or measured in response to receiving the first signal or the second signal or preconfigured second information. The first information is information measured or identified on the NR cell of the electronic device 101 in the process of performing a network attach procedure and may include at least one of synchronization signal block (SSB) measurement information, system information block (SIB) identification information, or self-interference measurement information. The second information is information that may be obtained without separate measurement or identification and may include at least one of information on the frequency band stored in the memory 130 or information on the characteristics of the service that the electronic device 101 is to use. The process of determining the uplink operation based on at least one of the first information or the second information may be performed as in the embodiments of FIGS. 6 to 9.

In operation 540, the electronic device 101 may transmit information on the determined uplink operation to the first base station. The information on the uplink operation may be transmitted to the first base station using UE capability transmission. For example, if the electronic device 101 determines to perform a single uplink operation (SUO) or a dual uplink operation (DUO), the processor 120 may set a single uplink operation (SUO) indication bit of the UE capability based on the determination.

According to an embodiment, a method for determining an uplink operation by an electronic device 101 configured to perform communication with a first base station using a first frequency band and communication with a second base station using a second frequency band may comprise receiving (510) a first signal from the first base station, using a first communication circuit 410, receiving (520) a second signal from the second base station, using a second communication circuit 420 while performing a communication connection with the first base station, selecting (530) one of a single uplink operation (SUO) or a dual uplink operation (DUO), based on at least one of information obtained or measured in response to receiving the first signal or the second signal or second information previously configured, and transmitting (540) information regarding the selected uplink operation to the first base station.

According to various embodiments of the present invention, transmitting (540) the information regarding the determined uplink operation may include transmitting the information regarding the uplink operation to the first base station using user equipment (UE) capability transmission.

According to various embodiments of the present invention, the first signal and the second signal may include at least one of a synchronization signal and a reference signal.

According to various embodiments of the present invention, determining (530) the uplink operation may include comparing a strength of the first signal with a first threshold and selecting one of the single uplink operation (SUO) or the dual uplink operation (DUO) based on a result of the comparison.

According to various embodiments of the present invention, determining (530) the uplink operation may include determining a center frequency of the first frequency based on the first signal, determining a center frequency of the second frequency based on the second signal, determining whether the center frequency of the first frequency is a harmonic frequency of the center frequency of the second frequency, and selecting one of the single uplink operation (SUO) or the dual uplink operation (DUO) based on a result of the determination.

According to various embodiments of the present invention, the preconfigured second information may be at least one of information regarding the first frequency band and the second frequency band or information regarding a characteristic of a service that the electronic device is to use.

Figure 6:
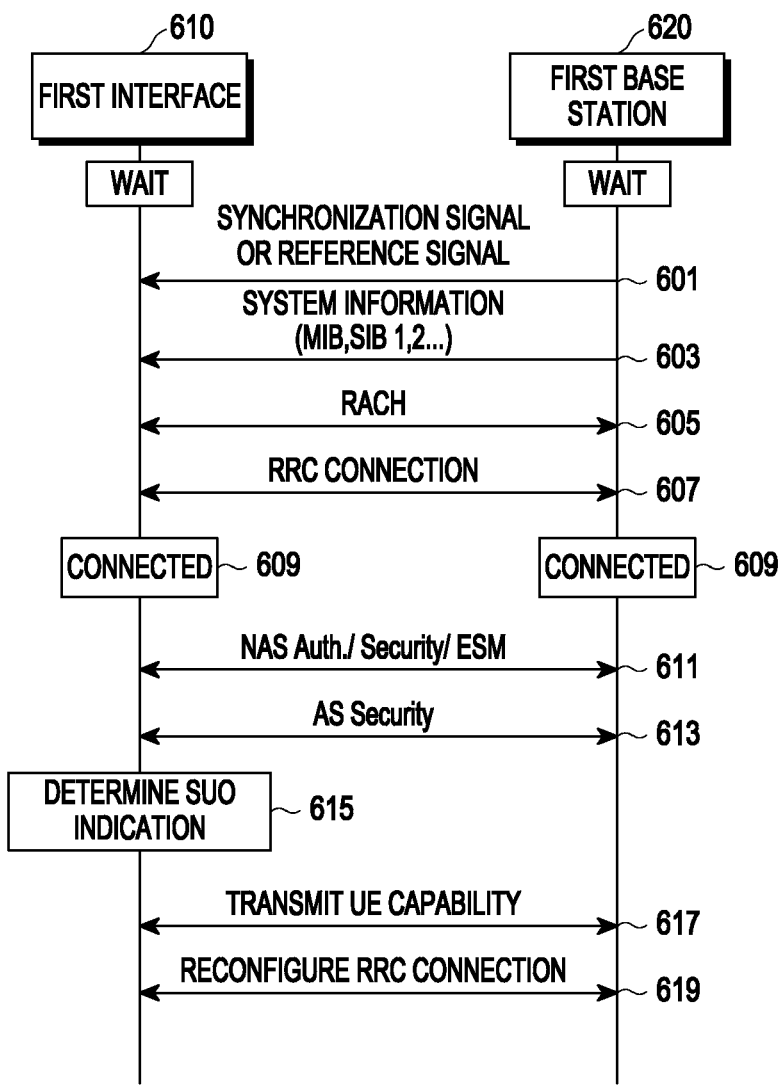
FIG. 6 is a view illustrating a procedure for performing a method of determining an uplink operation when an electronic device attaches to a network according to various embodiments of the present invention.

FIG. 6 is a view illustrating a procedure for performing a method of determining an uplink operation when an electronic device attaches to a network according to various embodiments of the present invention. In FIG. 6, a first interface 610 may be part of the electronic device 101 that performs wireless communication with the first base station 620 and may correspond to an interface using the second communication protocol stack 316 of FIG. 3. The first base station 620 may correspond to the LTE base station 340 performing wireless communication with the electronic device 101 using the LTE protocol stack 344 in FIG. 3.

Referring to FIG. 6, in operation 601, the first interface 610 may receive a synchronization signal or a reference signal from the first base station 620. For example, the synchronization signal or reference signal may be at least one of a primary synchronization signal (PSS), a secondary synchronization signal (SSS), a demodulation reference signal (DMRS) of a physical broadcast channel (PBCH), a cell specific reference signal (CRS), or a channel state information reference signal (CSI-RS) transmitted from the LTE base station. As another example, the synchronization signal or the reference signal may be at least one of a PSS, an SSS, a DMRS of a PBCH, or a CSI-RS of an SS/PBCH block transmitted from the NR base station.

In operation 603, the first interface 610 may receive system information (SI) from the first base station 620. The system information may be transmitted to the first interface 610 using at least one of a master information block (MIB) or a plurality of system information blocks (SIBs).

In operation 605, the first interface 610 and the first base station 620 may perform a random access process through transmission and reception of a random access channel (RACH) signal. In operation 607, a radio resource control (RRC) connection between the first interface 610 and the first base station 620 may be established.

In operation 609, the first interface 610 and the first base station 620 may be connected to each other. In operation 611, non-access stratum (NAS) authentication, security, or evolved packet system (EPS) session management (ESM) may be performed between the first interface 610 and the first base station 620. In operation 613, an access stratum (AS) security may be set between the first interface 610 and the first base station 620.

In operation 615, the first interface 610 may determine whether to perform a single uplink operation and determine a single uplink operation (SUO) indication. The first interface 610 may determine a single uplink operation (SUO) or dual uplink operation (DUO) based on at least one of per-difficult BC table information stored in the memory 130 or information regarding the characteristics of the service that the electronic device 101 is to use.

According to various embodiments of the present invention, when using the stored per-difficult BC table information, the first interface 610 may determine whether to perform the single uplink operation (SUO) based on a single uplink operation (SUO) preference value for difficult BCs included in the per-difficult BC table information.

According to various embodiments of the present invention, when using the information regarding the service characteristic, the first interface 610 may determine whether to perform the single uplink operation (SUO) depending on whether the service to be used by the electronic device 101 is a downlink-centered service or uplink-centered service. For example, in the case of a downlink-centered service, such as file download or video streaming using file transfer protocol (FTP), uplink traffic is relatively small and traffic may be intensively generated in the downlink path. Therefore, it may be determined to perform a single uplink operation (SUO) which is less influenced by self-interference although uplink transmission efficiency is slightly restricted so as to stably transmit the downlink hybrid automatic repeat request (HARQ) feedback. According to an embodiment, the electronic device 101 may identify the characteristics of the service to be used. For example, the characteristics of the service may be identified through information registered when an application is installed, or in such a manner that the user may directly designate the characteristics of the application.

In operation 617, the first interface 610 may transmit a UE capability including the single uplink operation (SUO) indication determined in operation 615 to the first base station 620. According to an embodiment, the first base station 620 may transmit a UE capability inquiry to the first interface 610 and, in response thereto, the first interface 610 may transmits UE capability information to the first base station 620.

Thereafter, in operation 619, the first interface 610 and the first base station 620 may exchange messages for radio resource control (RRC) connection reconfiguration.

Figure 7:
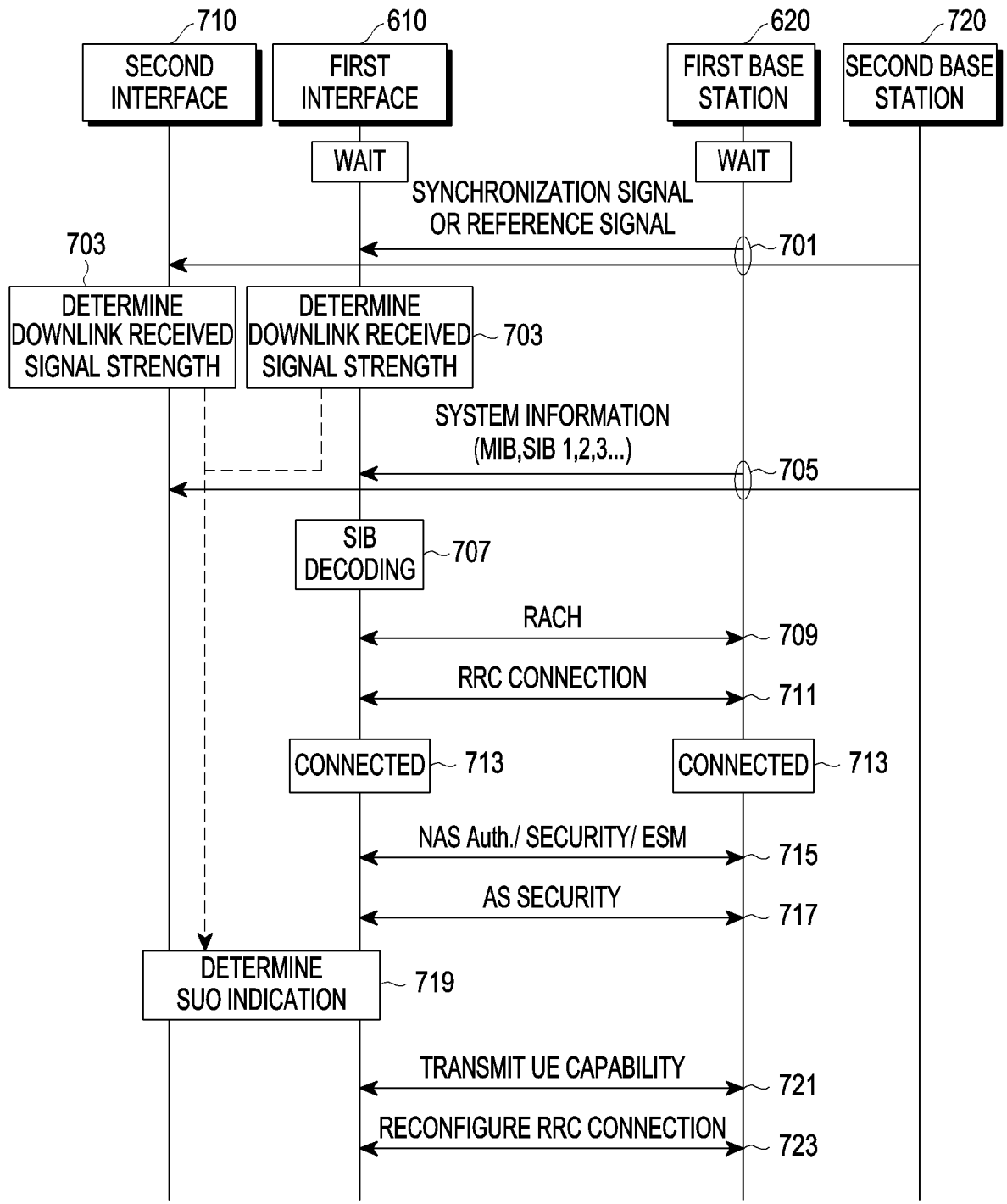
FIG. 7 is a view illustrating a procedure for performing a method of determining an uplink operation based on pre-measured information (e.g., strength measurement information for a downlink received signal) when an electronic device accesses a network according to various embodiments of the present invention.

FIG. 7 is a view illustrating a procedure for performing a method of determining an uplink operation based on pre-measured information (e.g., strength measurement information for a downlink received signal) when an electronic device accesses a network according to various embodiments of the present invention. In FIG. 7, a first interface 610 may be part of the electronic device 101 that performs wireless communication with the first base station 620 and may correspond to an interface using the second communication protocol stack 316 of FIG. 3. A second interface 710 may be part of the electronic device 101 that performs wireless communication with the second base station 720 and may correspond to an interface using the first communication protocol stack 314 of FIG. 3. The first base station 620 may correspond to the LTE base station 340 performing wireless communication with the electronic device 101 using the LTE protocol stack 344 in FIG. 3, and the second base station 720 may correspond to the NR base station 350 performing wireless communication with the electronic device 101 using the NR communication protocol stack 354 in FIG. 3.

Referring to FIG. 7, in operation 701, the first interface 610 may receive at least one of a synchronization signal or a reference signal from the first base station 620, and the second interface 710 may receive at least one of a synchronization signal or reference signal from the second base station 720.

In operation 703, the first interface 610 and the second interface 710 may determine the strength of a received signal in a downlink frequency band based on the synchronization signal or the reference signal received from the base stations. For example, the synchronization signal or the reference signal may be at least one of the PSS, SSS, DMRS of PBCH, CRS, or CSI-RS transmitted from the LTE base station. As another example, the synchronization signal or the reference signal may be at least one of a PSS, an SSS, a DMRS of a PBCH, or a CSI-RS of an SS/PBCH block transmitted from the NR base station. The determined frequency band may be a synchronization raster or an SSB frequency transmitted in the LTE or NR band of the difficult BC that may be supported by the electronic device 101. The SSB frequency or synchronization raster may correspond to the entire NR band of the difficult BC based on the information regarding the frequency band stored in the electronic device 101 or its range may be limited according to a specific condition. For example, the first interface 610 or the second interface 710 may selectively measure the outermost SSB of each band, or may perform measurement only on the SSBs positioned in some frequency areas where self-interference is expected to occur in the NR band of the difficult BC considering the LTE band to be used. As another example, the first interface 610 or the second interface 710 may measure only the SSBs positioned in some frequency areas where self-interference is expected to occur in the entire NR band of the difficult BC, based on location information about the electronic device 101.

In operation 705, the first interface 610 may receive system information (SI) from the first base station 620, and the second interface 710 may receive system information (SI) from the second base station 720. The system information may be transmitted to the first interface 610 and the second interface 710 using at least one of a master information block (MIB) or a plurality of system information blocks (SIBs).

In operation 707, the first interface 610 may decode the system information block (SIB) received from the first base station 620.

Operations 709 to 717 illustrated in FIG. 7 may be performed, corresponding to all or some of operations 605 to 613 of FIG. 6. When a connection is established between the first interface 610 and the first base station 620, in operation 719, the first interface 610 or the second interface 710 may determine whether to perform a single uplink operation and determine a single uplink operation (SUO) indication. According to various embodiments of the present invention, the first interface 610 or the second interface 710 may estimate the power expected when the electronic device 101 performs uplink transmission in the NR band, based on the result of measurement of operation 703. Based on the result of estimation, the first interface 610 or the second interface 710 may estimate the average magnitude of self-interference that may occur in the downlink band expected to be used and determine whether to perform a single uplink operation considering the estimated magnitude of self-interference. For example, when the strength of the downlink received signal measured in operation 703 is greater than a threshold, the first interface 610 may estimate that the downlink channel condition is good and is robust against self-interference or that the uplink transmission power is low so that the magnitude of self-interference occurring in the downlink band is small. In this case, since it is not necessary to perform a single uplink operation (SUO), the first interface 610 may determine to perform a dual uplink operation (DUO). When the strength of the downlink received signal measured in operation 703 is smaller than the threshold, the first interface 610 may estimate that the magnitude of the self-interference occurring in the downlink band is relatively large and thus determine to perform a single uplink operation (SUO).

In operation 721, the first interface 610 may transmit a UE capability including the single uplink operation (SUO) indication determined in operation 719 to the first base station 620. According to an embodiment, the first base station 620 may transmit a UE capability inquiry to the first interface 610 and, in response thereto, the first interface 610 may transmits UE capability information to the first base station 620.

Thereafter, in operation 723, the first interface 610 and the first base station 620 may exchange messages for radio resource control (RRC) connection reconfiguration.

Figure 8:
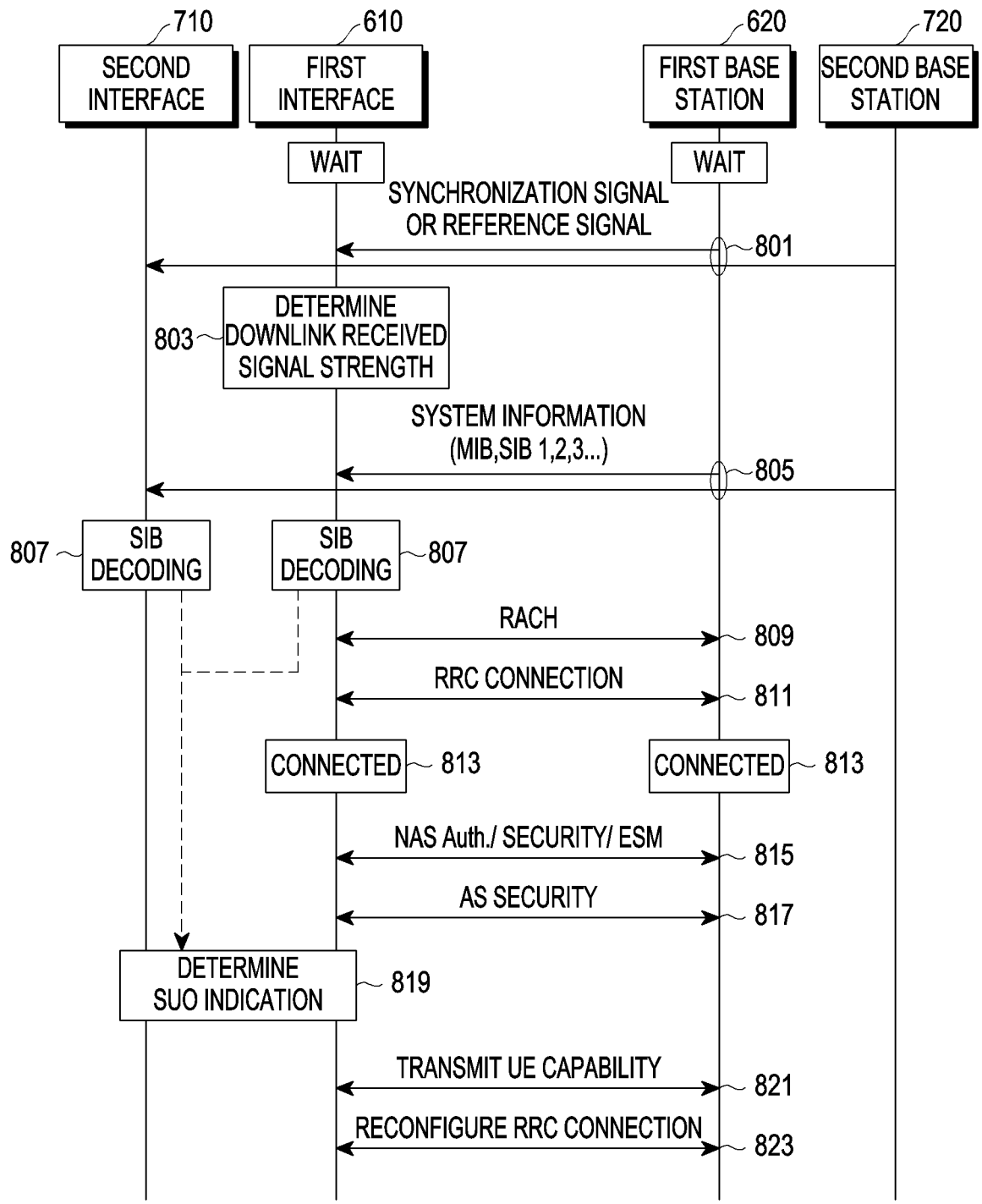
FIG. 8 is a view illustrating a procedure of performing a method of determining an uplink operation based on pre-measured information (e.g., system information block (SIB) confirmation information) when an electronic device accesses a network according to various embodiments of the present invention.

FIG. 8 is a view illustrating a procedure of performing a method of determining an uplink operation based on pre-measured information (e.g., system information block (SIB) confirmation information) when an electronic device accesses a network according to various embodiments of the present invention. In FIG. 8, a first interface 610 may be part of the electronic device 101 that performs wireless communication with the first base station 620 and may correspond to an interface using the second communication protocol stack 316 of FIG. 3. A second interface 710 may be part of the electronic device 101 that performs wireless communication with the second base station 720 and may correspond to an interface using the first communication protocol stack 314 of FIG. 3. The first base station 620 may correspond to the LTE base station 340 performing wireless communication with the electronic device 101 using the LTE protocol stack 344 in FIG. 3, and the second base station 720 may correspond to the NR base station 350 performing wireless communication with the electronic device 101 using the NR communication protocol stack 354 in FIG. 3.

Referring to FIG. 8, in operation 801, the first interface 610 may receive a synchronization signal or a reference signal from the first base station 620, and the second interface 710 may receive a synchronization signal or reference signal from the second base station 720.

In operation 803, the first interface 610 may determine the strength of the received signal in the downlink frequency band based on at least one of the synchronization signal or the reference signal received from the base stations. For example, the first interface 610 may measure the strength of at least one of the synchronization signal or the reference signal transmitted in the LTE or NR band of the difficult BC that may be supported by the electronic device 101. According to various embodiments of the present invention, the synchronization signal or the reference signal may be at least one of the PSS, SSS, DMRS of PBCH, CRS, or CSI-RS transmitted from the LTE base station. According to another embodiment, the synchronization signal or the reference signal may be at least one of a PSS, an SSS, a DMRS of a PBCH, or a CSI-RS of an SS/PBCH block transmitted from the NR base station.

In operation 805, the first interface 610 may receive system information (SI) from the first base station 620, and the second interface 710 may receive system information (SI) from the second base station 720. The system information may be transmitted to the first interface 610 and the second interface 710 using at least one of a master information block (MIB) or a plurality of system information blocks (SIBs).

In operation 807, the first interface 610 and the second interface 710 may decode the system information block (SIB) received from the base stations and identify the system information received in operation 805 through the decoding of the SIB. The first interface 610 and the second interface 710 may obtain at least one of LTE and NR band information, the frequency range actually used within each band, the position of the center frequency, or bandwidth, based on the identified system information. For example, the first interface 610 and the second interface 710 may identify the frequency range, which is actually operated although included in the difficult BC, the position of the center frequency, or bandwidth based on the identified system information and determine the degree of self-interference or the position of occurrence.

Operations 809 to 817 illustrated in FIG. 8 may be performed, corresponding to all or some of operations 605 to 613 of FIG. 6. When a connection is established between the first interface 610 and the first base station 620, in operation 819, the first interface 610 or the second interface 710 may determine whether to perform a single uplink operation and determine a single uplink operation (SUO) indication. According to various embodiments of the present invention, the first interface 610 or the second interface 710 may estimate whether self-interference occurs due to use of the corresponding band based on the information obtained in operation 807 and determine whether to perform a single uplink operation considering the result of estimation. For example, the first interface 610 may estimate the magnitude of occurring self-interference or the position where self-interference is expected to occur, considering influences by the frequency range actually used, center frequency, or bandwidth based on the information obtained in operation 807 and determine to perform a single uplink operation (SUO) or dual uplink operation (DUO) based on the result of estimation.

In operation 821, the first interface 610 may transmit a UE capability including the single uplink operation (SUO) indication determined in operation 819 to the first base station 620. According to an embodiment, the first base station 620 may transmit a UE capability inquiry to the first interface 610 and, in response thereto, the first interface 610 may transmits UE capability information to the first base station 620.

Thereafter, in operation 823, the first interface 610 and the first base station 620 may exchange messages for radio resource control (RRC) connection reconfiguration.

Figure 9:
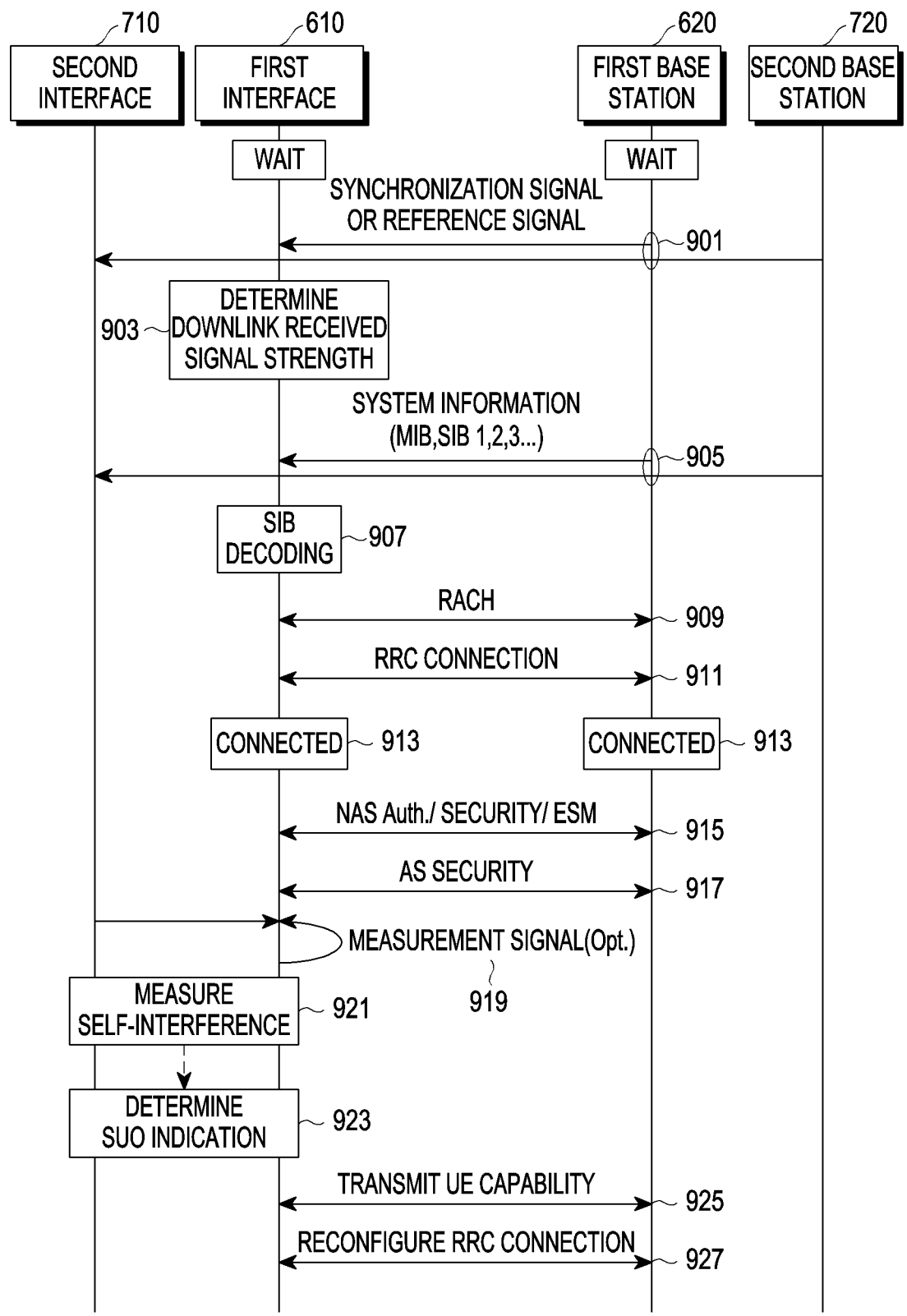
FIG. 9 is a view illustrating a procedure for performing a method of determining an uplink operation based on pre-measured information (e.g., self-interference measurement information) when an electronic device accesses a network according to various embodiments of the present invention.

FIG. 9 is a view illustrating a procedure for performing a method of determining an uplink operation based on pre-measured information (e.g., self-interference measurement information) when an electronic device accesses a network according to various embodiments of the present invention. In FIG. 9, a first interface 610 may be part of the electronic device 101 that performs wireless communication with the first base station 620 and may correspond to an interface using the second communication protocol stack 316 of FIG. 3. A second interface 710 may be part of the electronic device 101 that performs wireless communication with the second base station 720 and may correspond to an interface using the first communication protocol stack 314 of FIG. 3. The first base station 620 may correspond to the LTE base station 340 performing wireless communication with the electronic device 101 using the LTE protocol stack 344 in FIG. 3, and the second base station 720 may correspond to the NR base station 350 performing wireless communication with the electronic device 101 using the NR communication protocol stack 354 in FIG. 3.

Referring to FIG. 9, in operation 901, the first interface 610 may receive a synchronization signal or a reference signal from the first base station 620, and the second interface 710 may receive at least one of a synchronization signal or reference signal from the second base station 720.

In operation 903, the first interface 610 may determine the strength of the received signal in the downlink frequency band based on at least one of the synchronization signal or the reference signal received from the base stations. For example, the first interface 610 may measure the signal strength of the synchronization raster or the SSB frequency transmitted in the LTE or NR band of the difficult BC supportable by the electronic device 101. According to various embodiments of the present invention, the synchronization signal or the reference signal may be at least one of the PSS, SSS, DMRS of PBCH, CRS, or CSI-RS transmitted from the LTE base station. According to another embodiment, the synchronization signal or the reference signal may be at least one of a PSS, an SSS, a DMRS of a PBCH, or a CSI-RS of an SS/PBCH block transmitted from the NR base station.

In operation 905, the first interface 610 may receive system information (SI) from the first base station 620, and the second interface 710 may receive system information (SI) from the second base station 720. The system information may be transmitted to the first interface 610 and the second interface 710 using at least one of a master information block (MIB) or a plurality of system information blocks (SIBs).

In operation 907, the first interface 610 may decode the system information block (SIB) received from the first base station 620.

Operations 909 to 917 illustrated in FIG. 9 may be performed, corresponding to all or some of operations 605 to 613 of FIG. 6.

According to various embodiments of the present invention, in operation 921, the first interface 610 and the second interface 710 may directly measure self-interference caused by use of the corresponding band. For example, the electronic device 101 may measure self-interference using signals transmitted from the first interface 610 and/or the second interface 710. The transmitted signal may be a signal generated from the first interface 610 or the second interface 620 by the operation of the electronic device 101. As another example, as in operation 919, the first interface 610 and/or the second interface 710 may generate a separate signal for self-interference measurement and perform self-interference measurement based on the separate signal generated. The separate signal may be a signal separately generated for self-interference measurement if there is no signal generated from the first interface 610 and/or the second interface 710.

In operation 923, the first interface 610 or the second interface 710 may determine whether to perform a single uplink operation based on the result of self-interference measurement of operation 921 and, according to the result of determination, determine a single uplink operation (SUO) indication.

In operation 925, the first interface 610 may transmit a UE capability including the single uplink operation (SUO) indication determined in operation 923 to the first base station 620. According to an embodiment, the first base station 620 may transmit a UE capability inquiry to the first interface 610 and, in response thereto, the first interface 610 may transmits UE capability information to the first base station 620.

Thereafter, in operation 927, the first interface 610 and the first base station 620 may exchange messages for radio resource control (RRC) connection reconfiguration.

When performing a combination of two or more of the embodiments of FIG. 6, 7, 8, or 9, the electronic device 101 may more accurately estimate the degree of influence be self-interference to thereby determine whether to perform a single uplink operation (SUO), thus allowing for an enhanced network resource use efficiency and maintaining a transmission environment for high-quality services.

Figure 10:
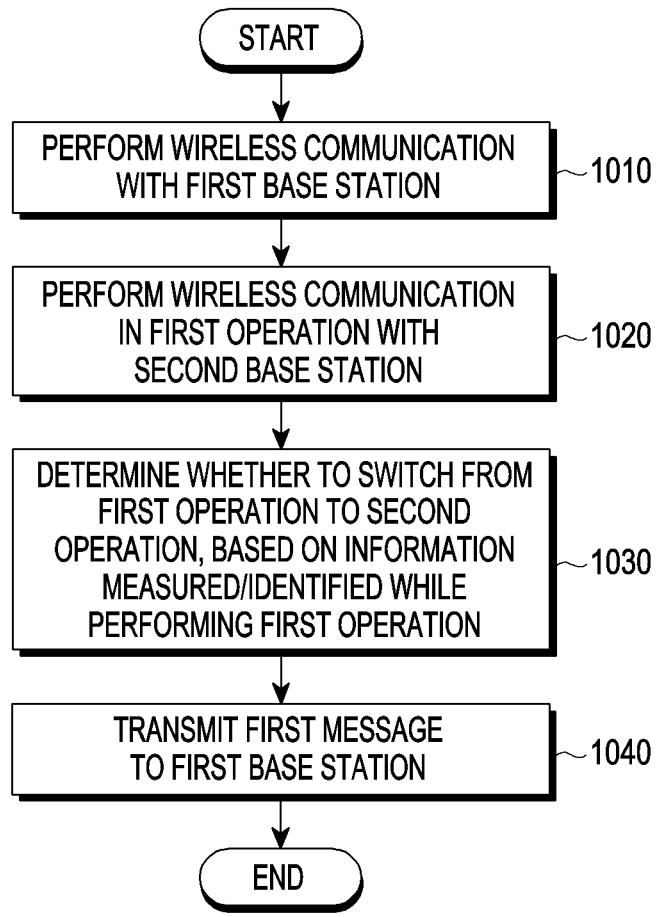
FIG. 10 is a flowchart illustrating a method of determining an uplink operation when an electronic device updates UE capability according to various embodiments of the present invention.

FIG. 10 is a flowchart illustrating a method of determining an uplink operation when an electronic device 101 updates a UE capability according to various embodiments of the present invention. According to an embodiment, the electronic device 101 may determine whether to switch the uplink operation after attaching to the network, change the single uplink operation (SUO) indication based on the determination, and transfer the same to the base station via a UE capability update.

In operation 1010, the electronic device 101 may perform wireless communication with the first base station using the first communication circuit 410. The first base station may be a base station (e.g., an eNB or the LTE base station 340 of FIG. 3) that provides a wireless connection between the electronic device 101 and the LTE network.

In operation 1020, the electronic device 101 may perform wireless communication with the second base station in the first operation using the second communication circuit 420. The second base station may be a base station (e.g., a gNB or the NR base station 350 of FIG. 3) that provides a wireless connection between the electronic device 101 and the 5G NR network. The first operation may be a single uplink operation (SUO) or a dual uplink operation (DUO).

In operation 1030, the electronic device 101 may determine whether to switch from the first operation to a second operation based on information measured or identified while performing the first operation. The second operation may be one different from the first operation, of a single uplink operation (SUO) or a dual uplink operation (DUO). The process of determining whether to switch the uplink operation based on the measured or identified information may be performed as in the embodiment of FIG. 11.

When the electronic device 101 determines to switch from the first operation to the second operation as a result of the determination in operation 1030, in operation 1040, the electronic device 101 may transmit, to the first base station, a first message indicating to switch from the first operation to the second operation. The first message may be transmitted to the first base station through UE capability update. For example, upon determining to switch to the dual uplink operation (DUO) during the single uplink operation (SUO) (or switch to the single uplink operation during the dual uplink operation), the electronic device 101 may update the single uplink operation (SUO) indication bit of the UE capability based on the determination and transmit the same.

When it is determined that the switch from the first operation to the second operation is not necessary as a result of the determination of operation 1030, the electronic device 101 may perform operation 1030 again when at least one condition of a designated period or a specific event is met. The specific event may correspond to at least one of a repositioning of the electronic device 101 or transmission of data.

According to an embodiment, a method for determining an uplink operation by an electronic device 101 performing communication with a first base station using a first frequency band and communication with a second base station using a second frequency band may comprise performing (1010) wireless communication with the first base station using a first communication circuit 410, performing (1020) wireless communication in a first operation which is one of a single uplink operation (SUO) or a dual uplink operation (DUO) with the second base station using a second communication circuit 420, determining (1030) whether to switch to a second operation different from the first operation, based on information measured or identified using the first communication circuit 410 or the second communication circuit 420 while performing the first operation, and transmitting (1040) a first message indicating to switch from the first operation to the second operation to the first base station based on the determination.

According to various embodiments of the present invention, operation 1040 of transmitting the first message to the first base station may transmit the first message to the first base station using a user equipment capability (UE) update.

Figure 11:
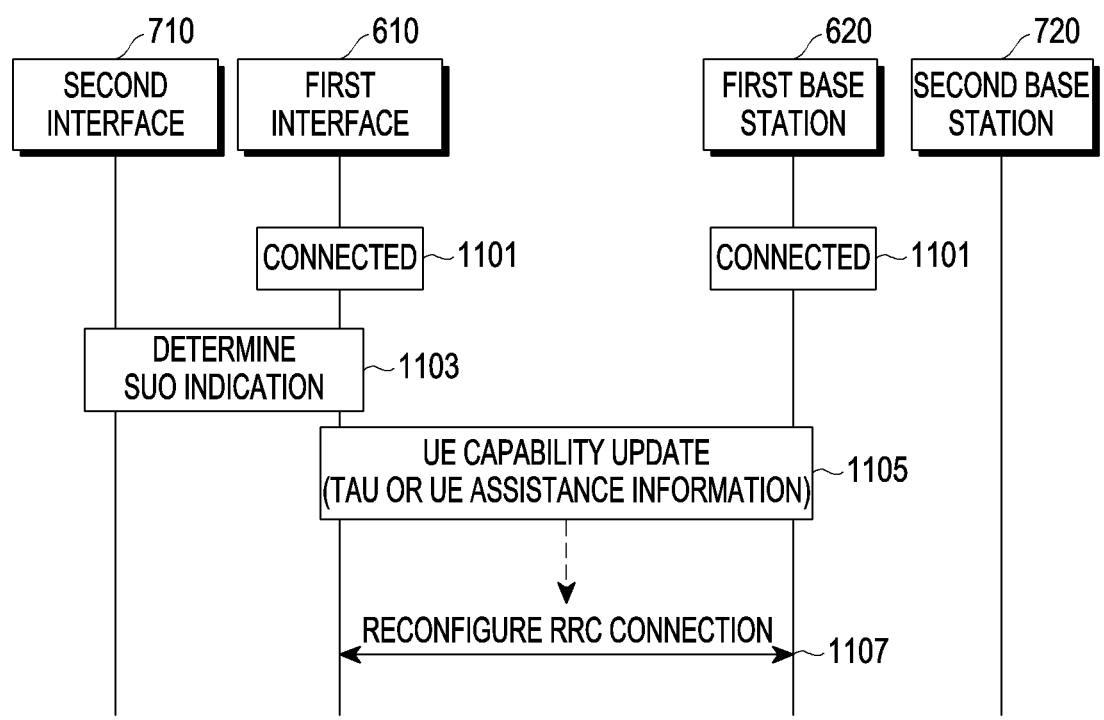
FIG. 11 is a view illustrating a procedure for performing a method of determining whether to switch an uplink operation after an electronic device accesses a network according to various embodiments of the present invention.

FIG. 11 is a view illustrating a procedure for performing a method of determining whether to switch an uplink operation after an electronic device accesses a network according to various embodiments of the present invention. In FIG. 11, a first interface 610 may be part of the electronic device 101 that performs wireless communication with the first base station 620 and may correspond to an interface using the second communication protocol stack 316 of FIG. 3. A second interface 710 may be part of the electronic device 101 that performs wireless communication with the second base station 720 and may correspond to an interface using the first communication protocol stack 314 of FIG. 3. The first base station 620 may correspond to the LTE base station 340 performing wireless communication with the electronic device 101 using the LTE protocol stack 344 in FIG. 3, and the second base station 720 may correspond to the NR base station 350 performing wireless communication with the electronic device 101 using the NR communication protocol stack 354 in FIG. 3.

Referring to FIG. 11, in operation 1101, a connection between the first interface 610 and the first base station 620 may be established, so that wireless communication may be performed in a single uplink operation (SUO) or a dual uplink operation (DUO). According to various embodiments of the present invention, a connection between the second interface 710 and the second base station 720 may be established in operation 1101. When the electronic device 101 is performing wireless communication with the base station in the single uplink operation (SUO), no connection may be established between the second interface 710 and the second base station 720 while only a connection is established between the first interface 610 and the first base station 620. When the electronic device 101 is performing wireless communication with the base station in the dual uplink operation (DUO), both a connection between the first interface 610 and the first interface 620 and a connection between the second interface 710 and the second interface 720 may be established.

In operation 1103, the first interface 610 and the second interface 710 may determine whether to switch the uplink operation which is being currently performed, based on information measured or identified while the electronic device 101 is operating in the multi-RAT-dual connectivity (MR-DC) and determine whether to update the single uplink operation (SUO) indication according to the result of determination. For example, upon determining that the single uplink operation (SUO) is appropriate based on the information measured/identified while performing the dual uplink operation (DUO), the first interface 610 may determine that it is needed to switch from the dual uplink operation to the single uplink operation and update the single uplink operation indication. As another example, upon determining that it is not needed any longer to perform the single uplink operation based on the information measured/identified while performing the single uplink operation (SUO), the first interface 610 may determine to switch from the single uplink operation to the dual uplink operation and update the single uplink operation indication. The first interface 610 may measure/identify information regarding the current communication status, periodically or when a specific event occurs (e.g., transmission of data or movement), while performing wireless communication in the single uplink operation (SUO) or dual uplink operation (DUO). The measured or identified information may include at least one of downlink channel measurement information, per-transmission path uplink transmission power information, hybrid automatic repeat and request (HARQ) process result information, per-data path uplink buffer status information, or new radio supplementary uplink (NR SUL) support information.

According to various embodiments of the present invention, the first interface 610 or the second interface 710 may measure downlink channel information and determine whether to perform a single uplink operation (SUO) based on the measurement result. The downlink channel information may be measured using at least one of the signal to noise ratio (SNR), the signal to interference plus noise ratio (SINR), or the reference signal received power (RSRP), which may be managed as a channel information history. When the strength of the downlink received signal falls below a designated threshold, the first interface 610 may determine that the degree of influence by the self-interference occurring from the uplink increases and determine to perform a single uplink operation (SUO). When the downlink SNR or SINR falls below a designated threshold, the first interface 610 may estimate that the signal to self-interference ratio increases in the downlink channel and determine to perform a single uplink operation (SUO). The measured downlink SNR or SINR may include a measurement value of the downlink reception end regardless of whether the electronic device 101 transmits at the uplink transmission end, which may include the case where the signal transmitted from the downlink reception end of the electronic device 101 is detected by the downlink reception end as being not less than the designated threshold when the signal is transmitted from the uplink transmission end of the electronic device 101.

According to various embodiments of the present invention, the first interface 610 or the second interface 710 may determine whether to perform a single uplink operation (SUO) based on the uplink transmission power for each transmission path. The first interface 610 may estimate the degree of influence by self-interference occurring on the downlink channel based on the uplink transmission power of the electronic device 101 and determine whether to perform a single uplink operation (SUO) considering the estimation result. For example, if the uplink transmission power of the electronic device 101 is less than a designated threshold, it may be determined that a single uplink operation (SUO) does not need to be performed because the magnitude of self-interference affecting the downlink is small. According to various embodiments of the present invention, if the transmission power in the frequency division duplex (FDD) uplink band corresponding to the downlink band of the electronic device 101 is small (e.g., when the distance to the base station is short so that uplink transmission power is low while downlink reception power is high), it may be relatively robust against the influence by occurring self-interference, so that it may be determined to perform a dual uplink operation (DUO) instead of a single uplink operation (SUO). According to various embodiments of the present invention, the electronic device 101 may estimate the distance to the base station based on power headroom report (PHR) information for each transmission path, and when the estimated distance is greater than or equal to a designated threshold, the electronic device 101 may determine to perform a single uplink operation (SUO).

According to various embodiments of the present invention, the first interface 610 or the second interface 710 may measure the result of a hybrid automatic repeat and request (HARQ) process in the downlink channel of the electronic device 101 operating in multi RAT-dual connectivity (MR-DC) in the difficult BC and may determine whether to perform the single uplink operation based on the measurement result history. For example, if at least one of the number of retransmissions of the downlink transport block, the proportion of the downlink transport blocks whose reception has failed, or the bit error rate (BER) of the received downlink transport block according to the result of measurement exceeds a designated threshold, the first interface 610 may determine that the degree of influence by self-interference is significant and thus determine to switch to the single uplink operation (SUO) to reduce influence by self-interference. Upon determining that it is needed to switch to the single uplink operation, the first interface 610 may send a request for a necessary tracking area update (TAU) or UE assistance information transmission procedure to the higher layer and update the UE capability, thereby switching from the dual uplink operation (DUO) to the single uplink operation.

According to various embodiments of the present invention, the first interface 610 or the second interface 710 may determine the uplink buffer state for each data path, and determine whether to perform a single uplink operation based on the determination result. For example, the first interface 610 may determine that traffic is asymmetrically concentrated only on a specific transmission path based on the state of the uplink buffer for each data path. In this case, since data transmission may be limited upon applying the time division multiplexing (TDM) pattern due to the single uplink operation, the processor 120 may determine to perform the dual uplink operation (DUO). According to various embodiments of the present invention, if the traffic in a specific transmission path is varied by a designated threshold or more as the electronic device 101 additionally uses a new service, the first interface 610 may again determine whether to switch the uplink operation based on the uplink buffer status for each transmission path.

According to various embodiments of the present invention, the first interface 610 or the second interface 710 may identify whether to support a supplementary uplink (SUL) band and determine whether to perform a single uplink operation based on the result of identification. For example, if a supplementary uplink (SUL) band is additionally supported instead of the new radio (NR) band of the difficult BC where self-interference occurs, the influence by self-interference may be avoided by using the SUL band. In this case, the first interface 610 may determine that a single uplink operation (SUO) is unnecessary and determine to perform a dual uplink operation (DUO) by not setting the single uplink operation indication bit of the UE capability. If it is instructed to use the supplementary uplink (SUL) band by an uplink control indication (UCI) or another method, the first interface 610 may identify whether to support or allow the SUL in the NR cell and then change to perform the dual uplink operation (DUO) by resetting the single uplink operation indication bit via updating the UE capability. To identify whether the new radio supplementary uplink (NR SUL) is supported, the first interface 610 may identify the history of prior use of the multi-RAT-dual connectivity (MR-DC) via the difficult BC on the corresponding master node (MN) during the network attach process and determine whether to set the single uplink operation indication bit based on the result of identification.

Upon determining in operation 1103 that the uplink operation is switched so that an update of the single uplink operation (SUO) indication is unnecessary, the first interface 610 may transmit the single uplink operation (SUO) indication, which has been varied by a UE capability update, to the first base station 620 in operation 1105. The first interface 610 may utilize a NAS procedure (e.g., tracking area update (TAU)) or an RRC procedure (e.g., UE assistance information or UE initiated UE capability update) to perform a UE capability update. In response to the change of the single uplink operation indication by the electronic device 101, the first base station 620 may allocate a new time division multiplexing (TDM) configuration for performing a single uplink operation (SUO) via RRC connection reconfiguration or release the time division multiplexing (TDM) configuration previously configured to perform the dual uplink operation (DUO).

According to various embodiments of the present invention, the method of updating the UE capability based on the NAS procedure may indicate that there is a UE capability to be changed or the changed UE capability is delivered to the network via the NAS procedure when the radio access capability of the electronic device 101 is changed. Since frequent triggering of a NAS procedure may overburden the network, the condition or frequency of triggering a NAS procedure for the purpose of updating UE capability may be limited.

According to various embodiments of the present invention, the method of updating the UE capability based on the RRC procedure may trigger a radio access capability update from the network by allowing the electronic device 101 to transfer the changed radio access capability using the RRC protocol or indicate that there is a radio access capability to be changed. For example, the electronic device 101 may update the changed single uplink operation indication through a UE assistance information-based UE capability update. Since the UE assistance information defined in the current standard is not defined for the purpose of setting a single uplink operation indication, a condition for initializing the procedure or modifying the message field may be additionally required to allow the UE assistance information procedure in the existing standard to be utilized for updating the single uplink operation indication. According to various embodiments of the present invention, the electronic device 101 may directly report the changed UE capability or indicate that there is a UE capability to be changed, which may be performed by updating the UE capability including the single uplink operation indication when the uplink operation is switched.

If the UE capability update is complete, in operation 1107, the first interface 610 and the first base station 620 may exchange messages for radio resource control (RRC) connection reconfiguration.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™ or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a storage medium storing instructions executed by at least one processor 120 to enable the at least one processor to perform at least one operation, which may include, in a method for determining an uplink operation by an electronic device 101 configured to perform communication with a first base station using a first frequency band and communication with a second base station using a second frequency band in a wireless communication system, receiving a first signal from the first base station, using a first communication circuit 410, receiving a second signal from the second base station, using a second communication circuit 420 while performing a communication connection with the first base station, selecting one of a single uplink operation (SUO) or a dual uplink operation (DUO), based on at least one of information obtained or measured in response to receiving the first signal or the second signal or second information previously configured, and transmitting information regarding the selected uplink operation to the first base station.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
 a first communication circuit performing first wireless communication using a first frequency band;
 a second communication circuit performing second wireless communication using a second frequency band;
 a processor operatively connected with the first communication circuit and the second communication circuit; and
 a memory operatively connected with the processor and configured to store information regarding the first frequency band and the second frequency band, wherein the memory stores instructions configured to, when executed, enable the processor to:
 perform a communication connection with a first base station using the first communication circuit to receive a first signal from the first base station;
 receive a second signal from a second base station using the second communication circuit, based on the information regarding the second frequency band while performing the communication connection with the first base station;
 select one of a single uplink operation (SUO) or a dual uplink operation (DUO), thereby resulting in a selected uplink operation, based on information obtained or measured in response to receiving the first signal or the second signal; and
 transmit information regarding the selected uplink operation to the first base station,
 wherein the instructions are configured to enable the processor to:
 determine a center frequency of the first frequency band based on the first signal;
 determine a center frequency of the second frequency band based on the second signal; and
 select one of the single uplink operation (SUO) or the dual uplink operation (DUO) based on at least part of the center frequency of the first frequency band or the center frequency of the second frequency band, and
 wherein the center frequency of the first frequency band is a harmonic frequency of the center frequency of the second frequency band.

2. The electronic device of claim 1, wherein the first frequency band and the second frequency band are included in a problematic band combination as defined by 3rd generation partnership project (3GPP) WG RAN4, and wherein the first signal and the second signal include at least one of a synchronization signal or a reference signal.

3. The electronic device of claim 1, wherein the instructions are configured to enable the processor to transmit the information regarding the selected uplink operation to the first base station using user equipment (UE) capability transmission.

4. The electronic device of claim 1, wherein the instructions are further configured to enable the processor to:
 compare a strength of the first signal with a first threshold; and
 select one of the single uplink operation (SUO) or the dual uplink operation (DUO) based on a result of the comparison.

5. An electronic device, comprising:
 a first communication circuit performing first wireless communication using a first frequency band;
 a second communication circuit performing second wireless communication using a second frequency band;
 a processor operatively connected with the first communication circuit and the second communication circuit; and
 a memory operatively connected with the processor, wherein
 the memory stores instructions configured to, when executed, enable the processor to:
 perform a communication connection with a first base station using the first communication circuit;
 perform wireless communication in a first operation, which is one of a single uplink operation (SUO) or a dual uplink operation (DUO), with a second base station using the second communication circuit;
 determine whether to switch to a second operation, which is different from the first operation, based on information measured or identified using the first communication circuit or the second communication circuit while performing the first operation; and
 transmit a first message indicating to switch from the first operation to the second operation to the first base station based on the determination,
 wherein the first operation is the dual uplink operation (DUO), and the second operation is the single uplink operation (SUO), and
 wherein the instructions are configured to enable the processor to:
 measure a communication status with the second base station based on at least one of a number of retransmissions of the first base station, a reception failure rate of the electronic device, or a bit error rate (BER) of a packet received from the first base station, during the dual uplink operation; and
 transmit the first message to the first base station based on a result of the measurement.

6. The electronic device of claim 5, wherein the instructions are configured to enable the processor to transmit the first message to the first base station using user equipment (UE) capability update.

7. The electronic device of claim 5, wherein the first operation is the single uplink operation (SUO), and the second operation is the dual uplink operation (DUO), and wherein
 the instructions are configured to enable the processor to:
 measure a strength of a signal received from the first base station while performing the single uplink operation;
 compare the strength of the signal with a threshold; and transmit the first message to the first base station based on a result of the comparison.

8. The electronic device of claim 5, wherein
the instructions are configured to enable the processor to:
identify whether the second base station supports a supplementary uplink (SUL) band based on at least part of a relationship between the first frequency band and the second frequency band; and
transmit the first message to the first base station based on a result of the identification.

9. A method for determining an uplink operation by an electronic device performing communication with a first base station using a first frequency band and communication with a second base station using a second frequency band in a wireless communication system, the method comprising:
receiving a first signal from the first base station, using a first communication circuit;
receiving a second signal from the second base station, using a second communication circuit while performing a communication connection with the first base station;
selecting one of a single uplink operation (SUO) or a dual uplink operation (DUO), thereby resulting in a selected uplink operation, based on at least one of information obtained or measured in response to receiving the first signal or the second signal or second information previously configured; and
transmitting information regarding the selected uplink operation to the first base station,
wherein selecting the one of the single uplink operation (SUO) or the dual uplink operation (DUO) comprises:
determining a center frequency of the first frequency band based on the first signal;
determining a center frequency of the second frequency band based on the second signal;
determining whether the center frequency of the first frequency band is a harmonic frequency of the center frequency of the second frequency band; and
selecting the one of the single uplink operation (SUO) or the dual uplink operation (DUO) based on a result of the determination.

10. The method of claim 9, wherein transmitting the information regarding the selected uplink operation includes transmitting the information regarding the uplink operation to the first base station using user equipment (UE) capability transmission.

11. The method of claim 9, wherein the first signal and the second signal include at least one of a synchronization signal or a reference signal.

12. The method of claim 9, further comprising:
comparing a strength of the first signal with a first threshold; and
selecting one of the single uplink operation (SUO) or the dual uplink operation (DUO) based on a result of the comparison.

* * * * *